United States Patent
Miyamori et al.

(10) Patent No.: US 6,803,065 B1
(45) Date of Patent: Oct. 12, 2004

(54) METHOD AND APPARATUS FOR MAKING SMOKED FOOD

(75) Inventors: Mamoru Miyamori, Hokkaido (JP); Hiroshi Hoshino, Hokkaido (JP); Toshihiko Maruyama, Hokkaido (JP); Masao Higuchi, Tokyo (JP); Hiroshi Saito, Tokyo (JP)

(73) Assignees: Unirex Co., Ltd., Hokkaido (JP); Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/786,963

(22) PCT Filed: Sep. 9, 1999

(86) PCT No.: PCT/JP99/04899
§ 371 (c)(1),
(2), (4) Date: May 16, 2001

(87) PCT Pub. No.: WO00/15052
PCT Pub. Date: Mar. 23, 2000

(30) Foreign Application Priority Data

Sep. 11, 1998 (JP) ............................................. 10/257765

(51) Int. Cl.⁷ ............................................... A23B 4/056

(52) U.S. Cl. ............................ 426/235; 99/451; 99/477; 426/315

(58) Field of Search ................................ 426/235, 314, 426/315; 99/451, 474, 477, 443 C

(56) References Cited

U.S. PATENT DOCUMENTS

| 2,565,454 A | 8/1951 | Mackenzie et al. ............ 99/261 |
| 2,844,478 A | * 7/1958 | Hanley et al. ............... 426/315 |
| 4,372,981 A | * 2/1983 | Lieberman ................... 426/235 |

FOREIGN PATENT DOCUMENTS

| JP | 52-82750 | 7/1977 |
| JP | 54-105248 | 8/1979 |
| JP | 63-214149 | 9/1988 |

* cited by examiner

*Primary Examiner*—George C. Yeung
(74) *Attorney, Agent, or Firm*—Reed Smith LLP

(57) ABSTRACT

An inlet (11a) and an exit (11b) are formed at opposite ends of a chamber (11), and transporting device (12) is moved into the chamber from the inlet toward the outlet. The transporting device is constituted to transport a plurality of works (19) at predetermined intervals. Disposed within the chamber is a pair of electrode plates (13, 14) along the longitudinal direction of the transporting device and at predetermined distances from the works, respectively so as to interpose the works between the pair of electrode plates. Smoke to be adhered to and infiltrated into works is constitutionally generated by smoke generating device (16) and introduced into the chamber. Applied between the pair of electrode plates is a DC voltage or AC voltage of 7 kV to 15 kV by a high voltage generating circuit, and works are grounded, this reduces the amount of electric power consumption, downsizes the apparatus, and renders the smoke to uniformly adheres to and infiltrates into works, to thereby improve the quality of smoked foods.

17 Claims, 14 Drawing Sheets

METHOD AND APPARATUS FOR MAKING SMOKED FOOD

TECHNICAL FIELD

The present invention relates to a method and an apparatus therefor for adhering smoke to farm products, marine products and livestock products or processed foods thereof and for infiltrating the smoke into them, to thereby manufacture smoked foods. More particularly, the present invention relates to a method and an apparatus therefor for adhering smoke to the aforementioned farm products and the like and for infiltrating the smoke into them, by utilizing a Coulomb force between the farm products and the like and the smoke electrified within an electric field.

BACKGROUND ART

There has been known a conventional electrical smoking method in which a pair of electric wires mutually separated by a predetermined distance are arranged within a chamber, works such as fish and meat are hung from the electric wires, a direct current or alternating current of a higher voltage (10 kV to 20 kV) is applied across the electric wires to thereby generate corona discharge, and furthermore, smoke is generated from a fire grate at the bottom of the chamber.

There has been known another conventional electrical smoking method in which a pair of mutually opposed electrodes are arranged within a chamber, food products such as fish and meat are arranged between the pair of electrodes, a higher voltage (such as 40 kV) is applied across the electrodes, and smoke generated by smoke generating means is introduced into the chamber.

In each of the aforementioned electrical smoking method, the smoke generated by the fire grate or the smoke generating means is supplied with ions thanks to the corona discharge, so that the thus electrified smoke is attracted to the food product acting as an electrode. This results in rapid adherence and infiltration of the smoke to and into the food product, to thereby provide a smoked food having a superior storage characteristic.

However, the aforementioned electrical smoking methods utilize an electric field within a corona discharged area, thereby causing a problem of an extremely large amount of electric power consumption and an enlarged size of the apparatus.

Further, in each of the aforementioned electrical smoking methods, since the corona discharge is conducted between the electrodes and the food product, the smoke ununiformly adheres to and infiltrates into the food product, thereby causing a problem of a deteriorated quality of the smoked food.

It is therefore a first object of the present invention to provide a smoking method and an apparatus therefor capable of reducing the amount of electric power consumption and of downsizing the apparatus.

It is a second object of the present invention to provide a smoking method and an apparatus therefor capable of uniformly adhering and infiltrating smoke to and into a food product such as a farm product to thereby improve the quality of the smoked food.

It is a third object of the present invention to provide a smoking method and an apparatus therefor capable of improving an efficiency of adherence and infiltration of smoke to and into a food product, to thereby effectively utilize the smoke and finish the food product into a delicious smoked food.

DISCLOSURE OF INVENTION

There will be described the constitution of the present invention for achieving the above objects.

The invention, as shown in FIGS. 1 and 3, is a smoking method comprising the steps of: transporting grounded food products 19 at a predetermined speed into a chamber 11 by transporting means 12, the food products 19 comprising farm products, marine products and livestock products or processed foods thereof, and applying a DC voltage or AC voltage of 7 kV to 15 kV between a pair of electrode plates 13, 14 disposed along the transporting means 12 within the chamber 11 so as to interpose the food product 19 between the pair of electrode plates 13, 14, so as not to start discharge.

According to the smoking method, application of the voltage between the pair of electrode plates 13, 14 leads to generation of an electric field incapable of initiating discharge between the pair of electrode plates 13, 14 to thereby electrify the smoke, and the thus electrified smoke adheres to and infiltrates into food products 19 by a Coulomb force based on the electric potential difference between the pair of electrode plates 13, 14. Further, since no discharge such as corona discharge is initiated between the electrode plates 13, 14 and food products 19, the electrified smoke uniformly adheres to and infiltrates into the food products 19.

The invention, as shown in FIGS. 9 and 10 or in FIG. 11, is a smoking method comprising the steps of: introducing smoke into a chamber 71 containing therein food products 19 and electrode plates 73, 74 alternately arranged with each other at predetermined intervals, and applying a DC voltage or AC voltage of 7 kV to 15 kV between the electrode plates 73, 74 or between the food products 19, so as not to start discharge.

According to the smoking method application of the voltage between the electrode plates 73, 74 or between food products 19 leads to generation of an electric field incapable of initiating discharge between the electrode plates 73, 74 or between food products 19 to thereby electrify the smoke, and the thus electrified smoke adheres to and infiltrates into food products 19 by a Coulomb force based on the electric potential difference between the electrode plates 73, 74 or between food products 19.

The invention, as shown in FIGS. 12 and 14, is a smoking method comprising the steps of: introducing smoke into a chamber 91 containing therein first and second electrodes 111, 112 arranged at predetermined intervals, and electrically connecting first and second food products 101, 102 to the first and second electrodes 111, 112, respectively, and applying a DC voltage or AC voltage of 7 kV to 15 kV between the first and second electrodes 111, 112 so as not to start discharge.

According to the smoking method, application of the voltage between the first and second electrodes 111, 112 leads to generation of an electric field incapable of initiating discharge between the first and second food products 101, 102 to thereby electrify the smoke, and the thus electrified smoke adheres to and infiltrates into first and second food products 101, 102 by a Coulomb force based on the electric potential difference between the first and second food products 101, 102.

The invention is a smoking method of characterized in that the distance between the adjacent electrode plate and food product or between adjacent food products is 20 mm to 100 mm.

According to the smoking method there can be more assuredly prevented initiation of discharge such as corona discharge or streamer discharge between the adjacent electrode plate and food product or between the adjacent food products.

The invention as shown in FIGS. 1 and 3, is a smoking apparatus comprising: a chamber 11 having opposite ends thereof formed with an inlet 11a and an exit 11b, respectively, transporting means 12 moved into the chamber 11 from the inlet 11a toward the exit 11b, and adapted to transport a plurality of food products 19 spaced at predetermined intervals, the food products 19 comprising farm products, marine products and livestock products or processed foods thereof, a pair of electrode plates 13, 14 disposed within the chamber 11 at predetermined distances from the food products 19, respectively, along the longitudinal direction of the transporting means 12 so as to interpose the food products 19 between the pair of electrode plates 13, 14, smoke generating means 16 for generating smoke to be adhered to and infiltrated into the food products 19, and for introducing the smoke into the chamber 11, and a high voltage generating circuit 17 adapted to apply a DC voltage or AC voltage of 7 kV to 15 kV between the pair of electrode plates 13, 14 so as not to start discharge, and adapted to ground the food products 19.

The smoking apparatus is an electric field generated which is incapable of initiating discharge between the pair of electrode plates 13, 14 to thereby electrify the smoke, and the thus electrified smoke adheres to and infiltrates into food products 19 by a Coulomb force based on the electric potential difference between the pair of electrode plates 13, 14. Further, since no discharge such as corona discharge is initiated between the electrode plates 13, 14 and food products 19, the electrified smoke uniformly adheres to and infiltrates into the food products 19.

The invention as shown in FIGS. 9 and 10 or in FIG. 11, is a smoking apparatus comprising: supporting tools 71a disposed within a chamber 71 and adapted to support a plurality of food products 19, respectively, a plurality of electrode plates 73, 74 disposed between the food products 19 supported by the supporting tools 71a, at predetermined distances from the food products 19, respectively, smoke generating means 16 for generating smoke to be adhered to and infiltrated into the food products 19, and for introducing the smoke into the chamber 71, and a high voltage generating circuit 17 adapted to apply a DC voltage or AC voltage of 7 kV to 15 kV between the plurality of food products 19 or between the plurality of electrode plates 73, 74 so as not to start discharge.

Moreover, the smoking apparatus may have an electric field generated which is incapable of initiating discharge between the electrode plates 73, 74 or between food products 19 to thereby electrify the smoke, and the thus electrified smoke adheres to and infiltrates into food products 19 by a Coulomb force based on the electric potential difference between the electrode plates 73, 74 or between food products 19.

The invention as shown in FIGS. 12 and 14, is a smoking apparatus comprising: first electrodes 111 disposed within a chamber 91, and electrically connected to a plurality of first food products 101, respectively, second electrodes 112 disposed within the chamber 91, each of second electrodes 112 disposed between the first electrodes 111 at predetermined distances from the first electrodes 111 and electrically connected to a plurality of second food products 102, smoke generating means 16 for generating smoke to be adhered to and infiltrated into the first and second food products 101, 102, and for introducing the smoke into the chamber 91, and a high voltage generating circuit 17 adapted to apply a DC voltage or AC voltage of 7 kV to 15 kV between the first and second electrodes 111, 112 so as not to start discharge.

In addition, the smoking apparatus may have an electric field generated which is incapable of initiating discharge between the first and second food products 101, 102 to thereby electrify the smoke, and the thus electrified smoke adheres to and infiltrates into first and second food products 101, 102 by a Coulomb force based on the electric potential difference between the first and second food products 101, 102.

The invention is further characterized in that the distance between the adjacent electrode plate and food product or between adjacent food products is 20 mm to 100 mm.

The smoking apparatus can also be characterized in that there can be more assuredly prevented initiation of discharge such as corona discharge or streamer discharge between the adjacent electrode plate and food product or between the adjacent food products.

The invention as shown in FIG. 3, is a smoking apparatus characterized in
   that the high voltage generating circuit 17 includes a single transformer 17a for boosting the commercial frequency voltage up to an AC voltage of 7 kV to 15 kV.
   that opposite ends of a secondary coil 17c of the transformer 17a are electrically connected to electrode plates 13, 14 or to food products 19, respectively, and
   that one end of an intermediate tapping electric wire 47 having the other end electrically connected to the food products 19 or to the electrode plates 13, 14 is electrically connected to an intermediate portion of the secondary coil 17c.

The smoking apparatus may also have one of the pair of electrode plates 13, 14 or of food products 19 becoming plus when the other of the pair of electrode plates 13, 14 or of food products 19 becomes minus. Thus, the electrified smoke between the electrode plates 13, 14 or between the food products 19 is immediately forced along the electric field generated between the electrode plates 13, 14 or between the food products 19 to thereby adhere onto and infiltrate into the food products 19.

The invention as shown in FIG. 15, is a smoking apparatus characterized in
   that the high voltage generating circuit 127 includes identical first and second transformers 121, 122 for boosting the commercial frequency voltage up to an AC voltage of 7 kV to 15 kV,
   that one ends of secondary coils 121b, 122b of the first and second transformers 121, 122 are electrically connected to electrode plates or to food products, respectively, and
   that the other ends of the secondary coils 121b, 122b of the first and second transformers 121, 122 are electrically connected to food products or to electrode plates, respectively, via common electric wire 123.

The smoking apparatus may also have the electrified smoke is immediately forced to adhere onto and infiltrate into the food products.

The invention as shown in FIG. 3 or in FIG. 15, is a smoking apparatus characterized in that the intermediate tapping electric wire 47 or the common electric wire 123 is provided with a diode 52a, 53a for rectifying the electric current flowing through the intermediate tapping electric wire 47 or the common electric wire 123.

It also becomes possible to give a desired plus or minus electric charge to the smoke. This ensures adherence and infiltration of the desired smoke onto and into food products, to thereby enable manufacture of a smoked food having a desired taste.

The invention as shown in FIGS. 1 and 4, is a smoking apparatus of anyone of claims 5 through 7, characterized in that the smoke generating means 16 includes: a hopper 22 for storing a smoking material 21, a screw conveyor 23 for transporting the smoking material 21, a burn heater 24 for incompletely burning the smoking material 21 transported by the screw conveyor 23, to thereby generate smoke, and a smoke inlet 26a for introducing the smoke into the chamber 11.

The smoking apparatus is a simple supply of the smoking material 21 into the hopper 22 enables automatic generation of the smoke and automatic introduction of the smoke into the chamber 11. Further, since the flow rate of the smoke can be extremely reduced, the efficiency of adherence and infiltration of the smoke onto and into food products 19 can be improved.

The invention as shown in FIGS. 4 and 5, is a smoking apparatus further comprising: an ionizing electrode wire 39 provided across a smoke inlet 26a for passing the smoke therethrough, the ionizing electrode wire 39 being applied with a DC voltage or AC voltage of 6 kV to 10 kV.

There is initiated streamer discharge between the ionizing electrode wire 39 and the smoke to thereby previously electrify the smoke.

Here, streamer discharge does mean discharge in which electrons accelerated by an electric field collide with gaseous molecules so as to successively ionize the gaseous molecules into a plasma state, to thereby convert a gas into a conductive matter. Note, during progression of the streamer discharge, electrons are increased in an avalanche manner, and there are observed plasma columns called streamers which comprise electrons and positive ions and are accompanied with light generation.

The invention as shown in FIG. 9 or FIG. 12, is a smoking apparatus of anyone of claims 5 through 7, further comprising: smoke circulating means 77 or 97 for circulating the smoke introduced into the chamber 71 or 91, wherein the smoke circulating means 77 or 97 comprises: a circulation duct 78 or 98 having opposite ends communicated to an upper part and a lower part of the chamber 71 or 91, respectively, and a fan 99 disposed within the circulation duct 78 or 98 so as to draw the smoke at the upper level within the chamber 71 or 91 into the upper end of the circulation duct 78 or 98 and to discharge the smoke from the lower end of the circulation duct 78 or 98 into the chamber 71 or 91.

Also operation of the fan 99 causes the smoke at the upper level within the chamber 71 or 91 to be drawn into the upper end of the circulation duct 78 or 98 and then to be discharged into the chamber 71 or 91 from the lower end of the circulation duct 78 or 98. This enables circulation of the smoke introduced into the chamber 71 or 91, to thereby allow utilization of the smoke without wastefulness.

The invention as shown in FIG. 3, is a smoking apparatus of anyone of claims 5 through 7, characterized in that condiments are added into a liquid 57c within a tank 57b of a humidifier 57 for keeping the humidity within the chamber 11 constant.

Also, operation of the humidifier 57 causes the condiments to be introduced into the chamber 11 together with the liquid 57c atomized by the humidifier 57, to thereby adhere onto and infiltrate into food products 19.

The invention as shown in FIG. 20, is a smoking apparatus characterized in that the supporting tools 71a and plurality of electrode plates 73, 74, or the first and second electrodes, are provided on a rack 221 to be removably moved into the chamber 71, and that the supporting tools 71a and plurality of electrode plates 73, 74, or the first and second electrodes, are electrically connected to the high voltage generating circuit via contact type electric collector 222.

According to another embodiment attaching and removing food products 19a, 19b to and from supporting tools 71a or first and second electrodes can be conducted outside the chamber, thereby improving food productability.

BEST MODE FOR CARRYING OUT THE INVENTION

There will be firstly detailed first embodiment of the present invention, with reference to the accompanying drawings.

Figure 1:
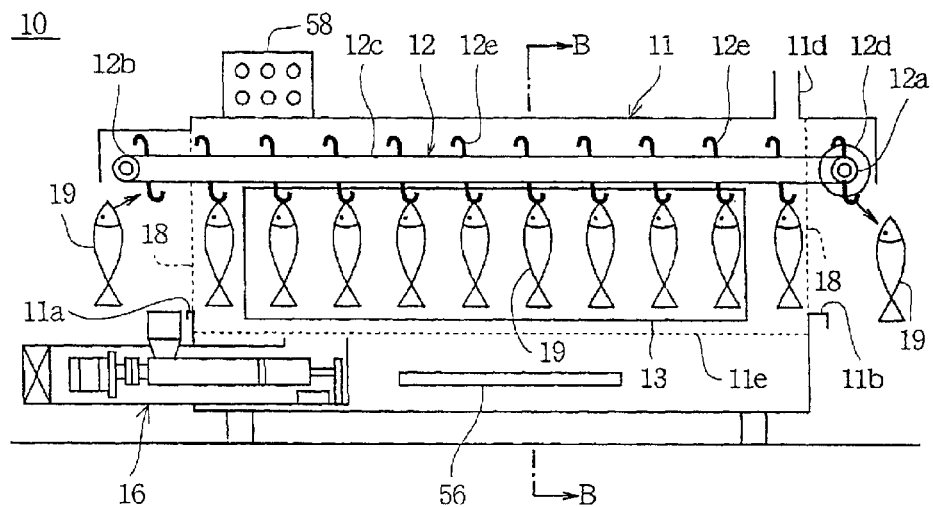
FIG. 1 is a cross-sectional view taken along a line A—A of FIG. 2 showing a smoking apparatus according to a first embodiment of the present invention.
Figure 2:
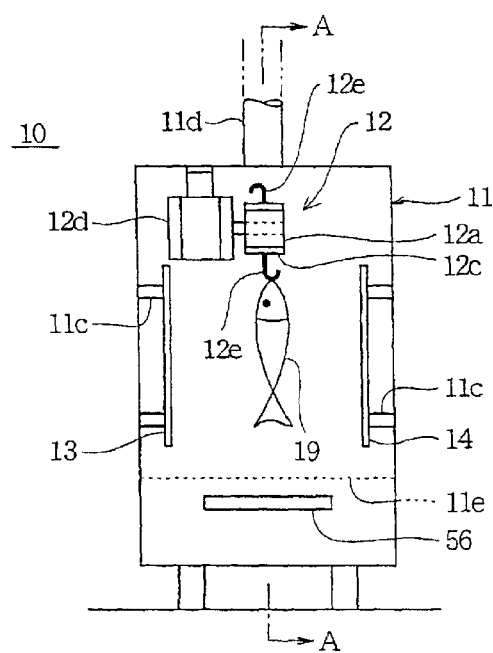
FIG. 2 is a cross-sectional view taken along a line B—B of FIG. 1.
Figure 3:
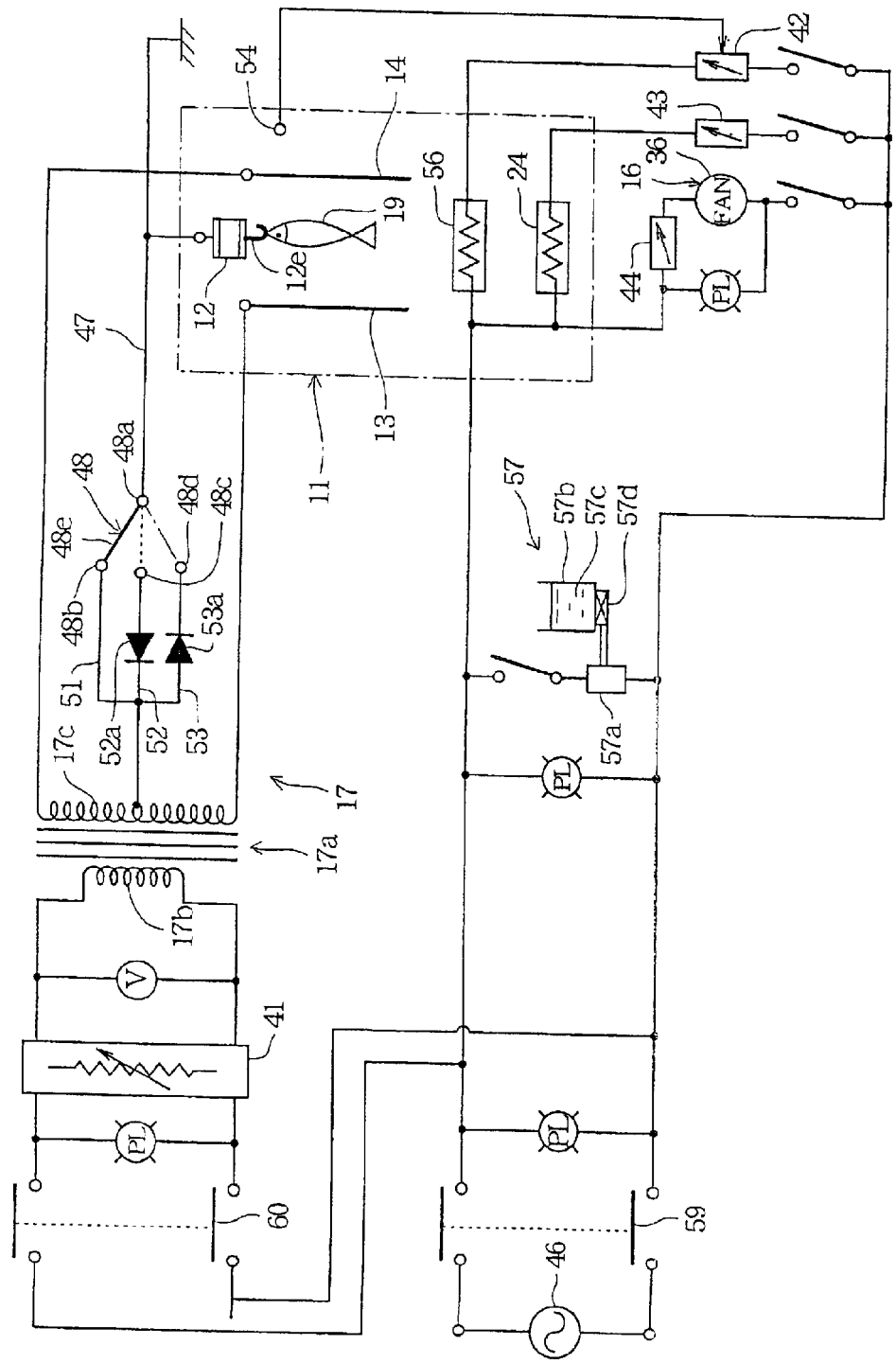
FIG. 3 is an electrical diagram of the apparatus.

As shown in FIGS. 1 through 3, reference numeral 10 designates a smoking apparatus comprising: a chamber 11 formed with an inlet 11a and an exit 11b at opposite ends of the chamber 11; transporting means 12 moved into the chamber 11 from the inlet 11a toward the exit 11b; a pair of electrode plates 13, 14 disposed along a longitudinal direction of the transporting means 12 within the chamber 11; smoke generating means 16 for generating smoke and introducing it into the chamber 11; and a high voltage generating circuit 17 for applying a predetermined DC voltage or AC voltage between the pair of electrode plates 13, 14. The chamber 11 is formed into a tumbled rectangular column (FIG. 2), and the inlet 11a and exit 11b of the chamber 11 are attached with electrically insulative curtains 18 in reed screen shapes, respectively, to prevent a worker from putting his/her hand into the chamber 11 (FIG. 1).

The transporting means 12 is a chain conveyor in this embodiment, and includes: a driving sprocket 12a rotatably mounted at an upper position of the exit 11b side of the chamber 11; a driven sprocket 12b rotatably mounted at an upper position of the inlet 11a side of the chamber 11; and an endless chain 12c wound around these sprockets 12a, 12b (FIGS. 1 and 2). The driving sprocket 12a is rotated by a driving motor 12d. Projected at predetermined intervals from an outer periphery of the chain 12c is a plurality of hooks 12e adapted to suspend a plurality of works 19, respectively, such as farm products, marine products, livestock products and processed foods thereof. The pair of electrode plates 13, 14 are disposed within the chamber 11 at predetermined distances from the works 19 suspended from the hooks 12e, respectively so as to interpose the works 19 between the pair of electrode plates 13, 14. Namely, the pair of electrode plates 13, 14 are mounted onto opposite inner surfaces of the chamber 11 via insulators 11c, respectively. The electrode plates 13, 14 are formed into mesh, punching metal or flat plate shapes, such as of aluminum, aluminum alloy, stainless steel, or titanium. Further, the works 19 are electrically connected to the chain 12c via hooks 12e. Works 19 include: fish and shellfish such as salmon, trout, crab, herring, scallop and squid; meat such as beef, pork, chicken; avian egg such as hen egg, quail egg; vegetables such as radish, carrot, burdock, celery, udo (*Aralia cordata*); and processed foods such as sausage, ham, beef jerky, bacon, cheese. The time length required by a work 19 suspended from one hook 12e to reach the exit 11b from the inlet 11a varies depending on the sort of the work 19, and is suitably set at a predetermined time length between 5 minutes to 2 hours. Note, instead of the chain conveyor, it is possible to adopt a wire conveyor or roller conveyor as the transporting means 12, and even a grounded cage to be transported through the chamber 11 at a predetermined speed.

The smoke generating means 16 is moved into the lower part of the chamber 11 from the inlet 11a side (FIG. 1). As shown in detail in FIGS. 4 and 5, this smoke generating means 16 includes: a hopper 22 for storing a mass of smoking material 21; a screw conveyor 23 for transporting the smoking material 21; a burn heater 24 for incompletely burning the smoking material 21 transported by the screw conveyor 23, to thereby generate smoke; and a smoke inlet 26a for introducing the smoke into the chamber 11. The smoking material 21 to be stored in the hopper 22 preferably includes: wood chips such as cherry tree, beech, oak; and orange peel, straw, black tea leaf, green tea leaf, herb, sake lees, miso, pinecone, coffee beans, and seed of pickled plum. Further, the smoke consists of a solid substance, a liquid substance and a gaseous substance (volatile substance), including: phenols such as guaiacol, eugenol; alcohols such as methyl alcohol and ethyl alcohol; carbonyl compounds such as formaldehyde and acetaldehyde; organic substances such as formic acid and acetic acid; and carbohydrates such as benzene and toluene. The screw conveyor 23 is housed within a rectangular column body 26, and comprises: a helical feeder 23c including a rotary shaft 23a and a vane 23b spirally fixed on the outer periphery of the rotary shaft 23a; a guiding cylinder 23d into which the helical feeder 23c is inserted; and an electric motor 23e for rotatively driving the helical feeder 23c.

Figure 4:
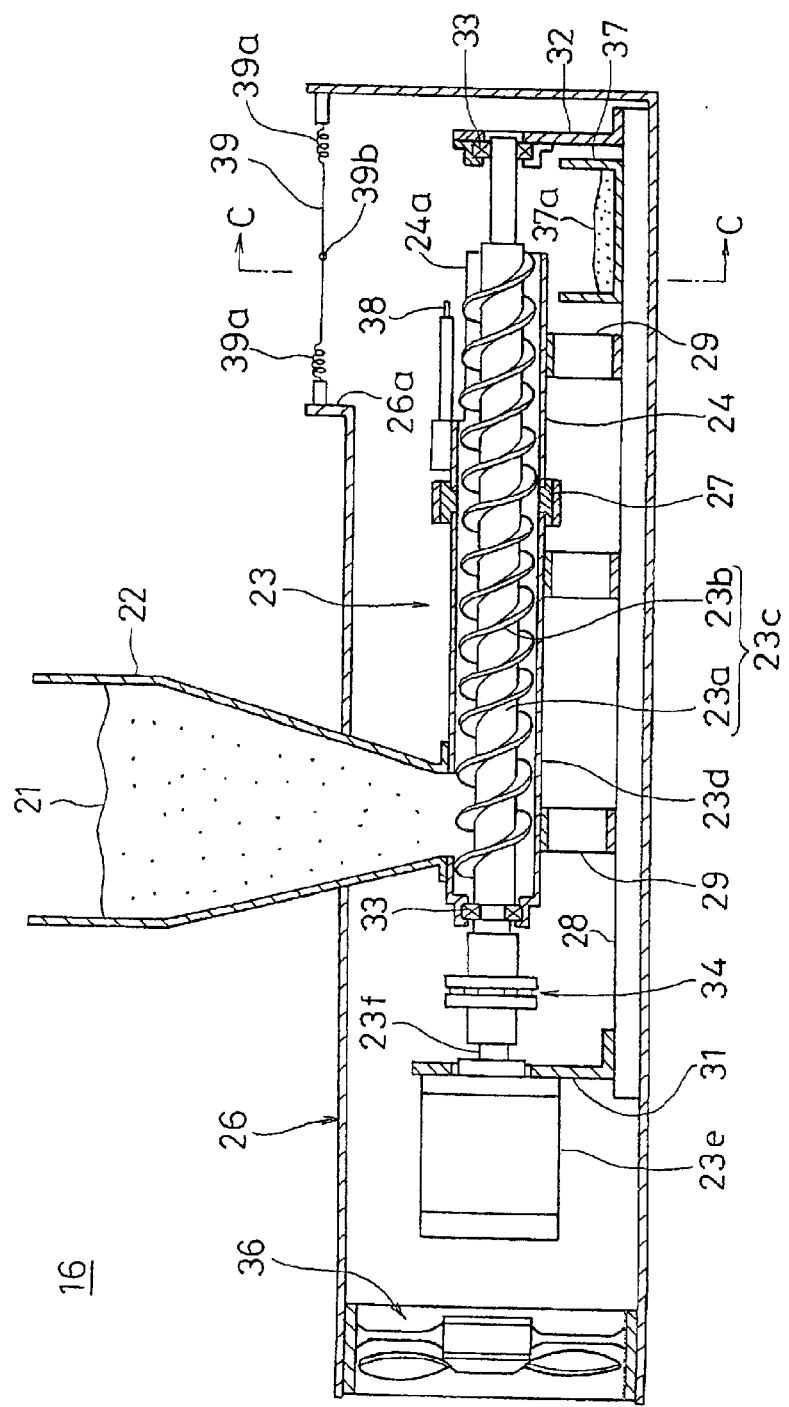
FIG. 4 is a longitudinal cross-sectional view showing smoke generating means.

The burn heater 24 is coupled to the distal end of the guiding cylinder 23d via insulating spacer 27 such that the guiding cylinder 23d and the burn heater 24 are horizontally placed on a base 28 via supports 29, the base 28 being fixed within the rectangular column body 26. The burn heater 24 is formed in a cylindrical shape having inner and outer diameters identical with those of the guiding cylinder 23d, respectively, and is formed with an opening part 24a throughout an area from the center to the distal end of the upper surface of the burn heater 24. The electric motor 23e is mounted to an upper surface of the proximal end of the base 28 via first bracket 31. The helical feeder 23c is rotatably inserted into the guiding cylinder 23d and burn heater 24. The helical feeder 23c has its near proximal end portion rotatably held by the proximal end of the guiding cylinder 23d via bearing 33, and its distal end rotatably held by another bearing 33 and a second bracket 32 mounted on, the upper surface of the distal end of the base 28. The proximal end of the helical feeder 23c is coupled to an output shaft 23f of the electric motor 23e via coupling 34, while the lower end of the hopper 22 is coupled to an upper surface of the guiding cylinder 23d near the proximal end of this cylinder 23d. The smoke inlet 26a is formed in an upper surface at the distal end of the rectangular column body 26. In FIG. 4, reference numeral 36 designates a fan insertedly mounted at the proximal end of the rectangular column body 26 so as to feed the smoke from the smoke inlet 26a into the chamber 11. Reference numeral 37 designates an ash tray placed on the upper surface of the base 28 near its distal end so as to receive ashes 37a left after combustion of the smoking material 21. Reference numeral 38 designates a temperature sensor provided at the opening part 24a of the burn heater 24 so as to detect the temperature of air (containing the smoke) passing through the smoke inlet 26a.

Figure 5:
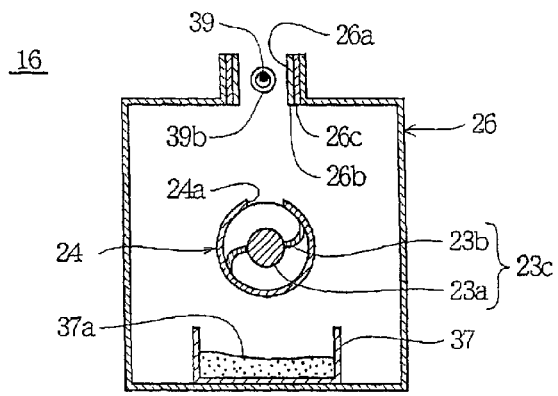
FIG. 5 is a cross-sectional view taken along a line C—C of FIG. 4.

Provided across the smoke inlet 26a is an ionizing electrode wire 39. This electrode wire 39 is preferably formed of a tungsten wire, and has opposite ends connected with pulling coil springs 39a, respectively, for providing the electrode wire 39 with a tensile force. Further, a pair of electrically conductive plates 26b, 26b are mounted at the opposite sides of the inner surface of the smoke inlet 26a, via insulating plates 26c, 26c, respectively (FIG. 5). There is applied a DC voltage or AC voltage of 5 kV to 15 kV, and preferably 6 kV to 10 kV, between the electrode wire 39 and the electrically conductive plates 26b, 26b. To initiate streamer discharge between the electrode wire 39 and electrically conductive plates 26b, 26b, the distance between the electrode wire 39 and each electrically conductive plate 26b is set at 8 to 15 mm, and preferably on the order of 10 mm. The electrode wire 39 loosely carries thereon an insulating ring 39b such as glass bead or glass sleeve upon flying out of electrons from the electrode wire 39, the electrode wire 39 may resonate as a reaction thereto to thereby vibrate, and the insulating ring 39b is provided to restrict such resonance.

As shown in detail in FIG. 3, the high voltage generating circuit 17 includes a single transformer 17a for boosting the commercial frequency voltage up to an AC voltage of 7 kV to 15 kV. This transformer 17a has its secondary coil 17b connected to a commercial frequency power source 46 of AC 100V or AC 200 V, via first controller 41. The first controller 41 is constituted of a voltage regulator (SLIDAC), for example, for adjusting the commercial frequency voltage. Adjustment of this first controller 41 allows to boost the voltage of a secondary coil 17c of the transformer 17a up to a predetermined voltage within a range of 7 kV to 15 kV. Both ends of the secondary coil 17c of the transformer 17a are electrically connected to the pair of electrode plates 13, 14, respectively, while the secondary coil 17c and works 19 are electrically connected via intermediate tapping electric wire 47. This intermediate tapping electric wire 47 has one end electrically connected to works 19 via chain 12c and hooks 12e, and the other end electrically connected to an intermediate portion of the secondary coil 17c. Note, works 19 are grounded via hook 12e and chain 12c.

The intermediate tapping electric wire 47 is provided with a changeover switch 48. This switch 48 includes: a single common contact 48a; first through third changeover contacts 48b, 48c, 48d; and a movable piece 48e having one end connected to the common contact 48a and other end switchably connected to one of the first through third changeover contacts 48b, 48c, 48d. The first through third changeover contacts 48b, 48c, 48d are connected to the intermediate portion of the secondary coil 17c via first through third branching electric wires 51, 52, 53. The second branching electric wire 52 is provided with a first diode 52a for allowing an electric current from the second changeover contact 48c toward the secondary coil 17c and inhibiting an opposite electric current, while the third branching electric wire 53 is provided with a second diode 53a for inhibiting an electric current from the third changeover contact 48d toward the secondary coil and allowing an opposite electric current.

Applied between the pair of electrode plates 13, 14 is a DC voltage or AC voltage of 7 kV to 15 kV, and preferably 8 kV to 12 kV, identically with that of the secondary coil 17c of the transformer 17a. The distances between the electrode plates 13, 14 and works 19 are preferably set at 20 mm to 100 mm, and more preferably 25 to 80 mm, respectively. Why the voltage to be applied between the pair of electrode plates 13, 14 is limited to a range of 7 kV to 15 kV is that voltages below 7 kV lead to insufficient electrification of the smoke and voltages exceeding 15 kV lead to initiation of discharge. Why the distances between the electrode plates 13, 14 and works 19 are set at 20 mm to 100 mm is that distances shorter than 20 mm leads to initiation of discharge and distances exceeding 100 mm lead to insufficient electrification of the smoke. The voltage to be applied between the pair of electrode plates 13, 14 and the distances between the electrode plates 13, 14 and works 19 have a proportional relationship assuming that the electric field to be generated between the pair of electrode plates 13, 14 is constant. These voltage and distances are appropriately set at optimum values within the aforementioned ranges, respectively.

Provided within the chamber 11 are a temperature sensor 54 (FIG. 3) for detecting the temperature within the chamber 11, and a thermostatic heater 56 (FIGS. 1 through 3) for adjusting the temperature within the chamber 11. The thermostatic heater 56 is constituted to be controlled by a second controller 42 (FIG. 3), based on the detection output from the temperature sensor 54. Further, the burn heater 24 of the smoke generating means 16 is controlled by a third controller 43, while the rotational speed of the fan 36 is controlled by a fourth controller 44. The chamber 11 is further communicated with a humidifier 57 for keeping the humidity within the chamber 11 constant, via duct (not shown). The humidifier 57 is an ultrasonic humidifier in this embodiment, and includes an oscillation circuit 57a electrically connected to the commercial frequency power source 46, and an ultrasonic vibrating element 57d which is electrically connected to the oscillation circuit 57a and which is provided at a bottom of a tank 57b.

The ultrasonic vibrating element 57d is preferably constituted to be vibrated at a frequency of 28 kHz to 50 kHz, by the oscillation circuit 57a. The tank 57b contains a liquid 57c (such as water) added with condiments. The condiments preferably include miso, soy sauce, salt, sugar, garlic, sweet sake, wine, or mixtures thereof. In FIG. 1, reference numeral 58 designates a controlling box. In FIGS. 1 and 2, reference numeral 11d designates an exhaust duct for exhausting, together with air, the smoke introduced into the chamber 11, and reference numeral 11e designates a mesh-like screen provided at the lower part of the chamber so as to catch foreign matters such as fallen from works 19. In FIG. 3, reference numeral 59 designates a main switch, and reference numeral 60 designates a high-voltage-generating-circuit oriented switch.

In this embodiment, the smoke introduced into the chamber is to be exhausted into the atmosphere from the exhaust duct. However, it is possible to connect one end of a circulation duct to an intermediate portion of the exhaust duct, to connect the other end of the circulation duct to the lower part of the chamber, and to provide a fan within the circulation duct. In this situation, operation of the fan causes the smoke within the chamber to be again introduced into the lower part of the chamber through the circulation duct, thereby utilizing the smoke without wastefulness.

Further, works are to be suspended from the transporting means, in the above embodiment. However, works may be pinched by the transporting means or disposed on the transporting means, insofar as works can be transported by the transporting means at predetermined intervals.

There will be now described the operation of the thus constituted smoking apparatus.

Firstly, the smoking material 21 is stored within the hopper 22 and the smoke generating means 16 is operated, to thereby apply a predetermined DC voltage or AC voltage to the ionizing electrode wire 39. As the helical feeder 23c is rotatively driven by the electric motor 23e, the smoking material 21 within the hopper 22 is transported through the guiding cylinder 23d up to the burn heater 24, and incompletely burnt by the burn heater 24 to thereby generate smoke. This smoke goes up through the opening part 24a of the burn heater 24, and is then carried by the air stream caused by the fan 36 from the smoke inlet 26a into the chamber 11. In this way, simple supply of the smoking material 21 into the hopper 22 allows automatic generation of the smoke by the smoke generating means 16, and automatic introduction of the smoke into the chamber 11.

Further, controlling the rotational speed of the fan 36 by the fourth controller 44 allows an extremely lower flow rate of the smoke. This allows an extremely small flow of the smoke within the chamber 11, thereby allowing an improvement in an efficiency of adherence and infiltration of the smoke to and into works 19. When the smoke passes through the smoke inlet 26a, there has been started the streamer discharge between the ionizing electrode wire 39 and the electrically conductive plates 26b, 26b. Thus, there is also initiated streamer discharge between the ionizing electrode wire 39 or electrically conductive plates 26b and the smoke. This allows electrification of a large amount of smoke, before introduction thereof into the chamber 11.

Next, the transporting means 12 is operated when the smoke has spread throughout the interior of the chamber 11, so as to apply a predetermined AC voltage between the pair of electrode plates 13, 14 by the high voltage generating circuit 17 under a state where the changeover switch 48 is switched to the first changeover contact 48b. This causes a predetermined electric field incapable of initiating discharge between the pair of electrode plates 13, 14, so that the smoke which has not been electrified is also electrified, thereby resulting in electrification of substantially the whole of the smoke within the chamber 11. Under this condition, those works 19 hung on hooks 12e positioned outside the inlet 11a of the chamber 11 are brought into the chamber 11 via inlet 11a up to between the pair of electrode plates 13, 14, so that the electrified smoke is adhered to and infiltrated into works 19 by a Coulomb force based on the electric potential difference between the pair of electrode plates 13, 14.

Figure 6:
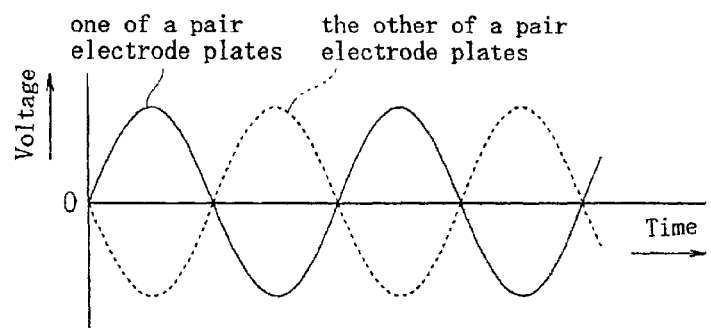
FIG. 6 is a graph showing transitions of voltages applied between a pair of electrode plates when a changeover switch of an intermediate-tap oriented electric wire of a high voltage generating circuit is turned to a first switching contact.

The voltages to be applied to the pair of electrode plates 13, 14, respectively, vary in the manner shown in FIG. 6. Namely, viewed from the center point comprising the intermediate tapping electric wire 47, one of the pair of electrode plates 13, 14 becomes plus when the other becomes minus, one of the pair of electrode plates 13, 14 becomes minus when the other becomes plus, and the pair of electrode plates 13, 14 alternately become plus and minus. As a result, the positively electrified smoke is immediately forced along electric force lines between electrode plates 13, 14, and the negatively electrified smoke is immediately forced in the direction opposite to the electric force lines, to thereby adhere onto and infiltrate into the works 19, so that the electrified smoke can be effectively adhered to and infiltrated into the works 19. The voltage to be applied between the pair of electrode plates 13, 14 is low as compared with that in the conventional electrical smoking method, so that no discharge is initiated between these electrode plates 13, 14. This allows an extremely low electric current to be flowed between the electrode plates 13, 14, and only a slight amount of electric power consumption. Further, those ingredients such as phenols, alcohols and acetic acid included in the smoke adhered to and infiltrated into the works 19 will restrict development, growth and increase of bacteria within works 19, and bacteria within works 19 will perish by placing works 19 within an electrostatic field as described above. Namely, the smoking apparatus of the present invention also has an antibacterial and sterilizing effect. Note, the smoke also includes ingredients such as: tar which adheres to and infiltrates into works 19 to thereby color works 19 in a particular color; and aromatics for providing works 19 with a specific aroma.

Further, application of a high frequency voltage to the ultrasonic vibrating element 57d from the oscillation circuit 57a cause vibration of the ultrasonic vibrating element 57d at an extremely high frequency. Thus, addition of condiments to the liquid 57c within the tank 57b of the humidifier 57 results in atomization of the liquid 57c together with the condiments upon transmission of the vibration to the liquid 57c. As a result, condiments atomized together with the liquid 57c are introduced into the chamber 11 through the duct (not shown), electrified between the pair of electrode plates 13, 14, and then adhered to and infiltrated into works 19, to thereby deepen the taste of works 19.

Figure 7:
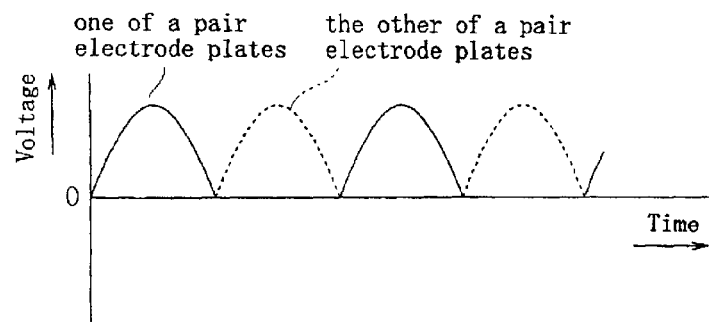
FIG. 7 is a graph showing transitions of voltages applied between the pair of electrode plates when the changeover switch of the intermediate-tap oriented electric wire of the high voltage generating circuit is turned to a second switching contact.

Meanwhile, when the movable piece 48e of the changeover switch 48 is switched to the second changeover contact 48c, the voltages to be applied to the pair of electrode plates 13, 14 respectively, vary in the manner shown in FIG. 7. Namely, viewed from the center point comprising the intermediate tapping electric wire 47, one of the pair of electrode plates 13, 14 becomes plus when the other becomes neutral, one of the pair of electrode plates 13, 14 becomes neutral when the other becomes plus, and the pair of electrode plates 13, 14 alternately become plus. As a result, it becomes possible to provide the smoke with a negative charge between the pair of electrode plates 13, 14 so as to assuredly render the desired smoke to adhere onto and infiltrate into works 19, to thereby enable manufacture of a smoked food having a desired taste.

Figure 8:
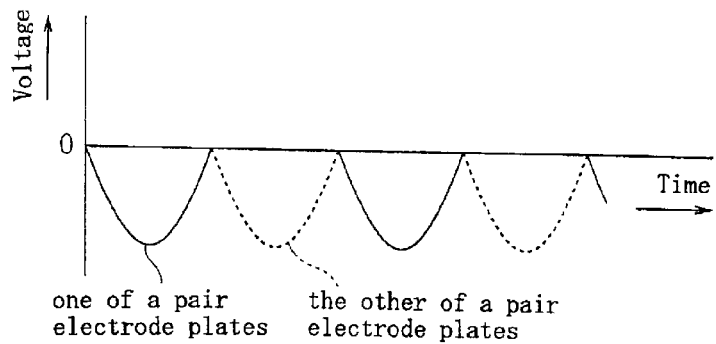
FIG. 8 is a graph showing transitions of voltages applied between the pair of electrode plates when the changeover switch of the intermediate-tap oriented electric wire of the high voltage generating circuit is turned to a third switching contact.

Further, when the movable piece 48e of the changeover switch 48 is switched to the third changeover contact 48d, the voltages to be applied to the pair of electrode plates 13, 14 respectively, vary in the manner shown in FIG. 8. Namely, viewed from the center point comprising the intermediate tapping electric wire 47, one of the pair of electrode plates 13, 14 becomes minus when the other becomes neutral, one of the pair of electrode plates 13, 14 becomes neutral when the other becomes minus, and the pair of electrode plates 13, 14 alternately become minus. As a result, it becomes possible to provide the smoke with a positive charge between the pair of electrode plates 13, 14 so as to assuredly render the desired smoke to adhere onto and infiltrate into works 19, to thereby enable manufacture of a smoked food having a desired taste.

Figure 9:
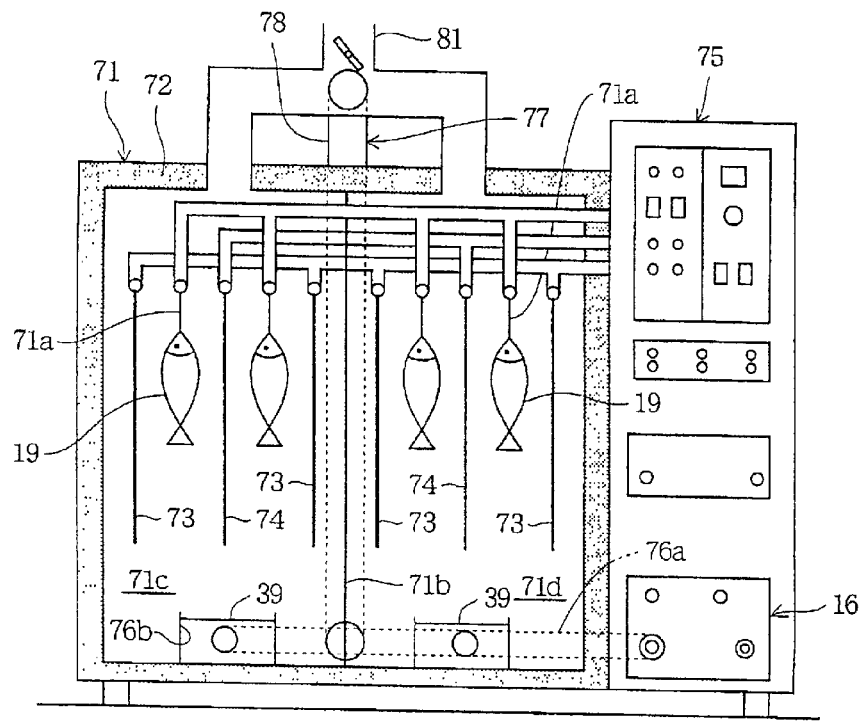
FIG. 9 is a cross-sectional view of a constitution showing a second embodiment of the present invention.
Figure 10:
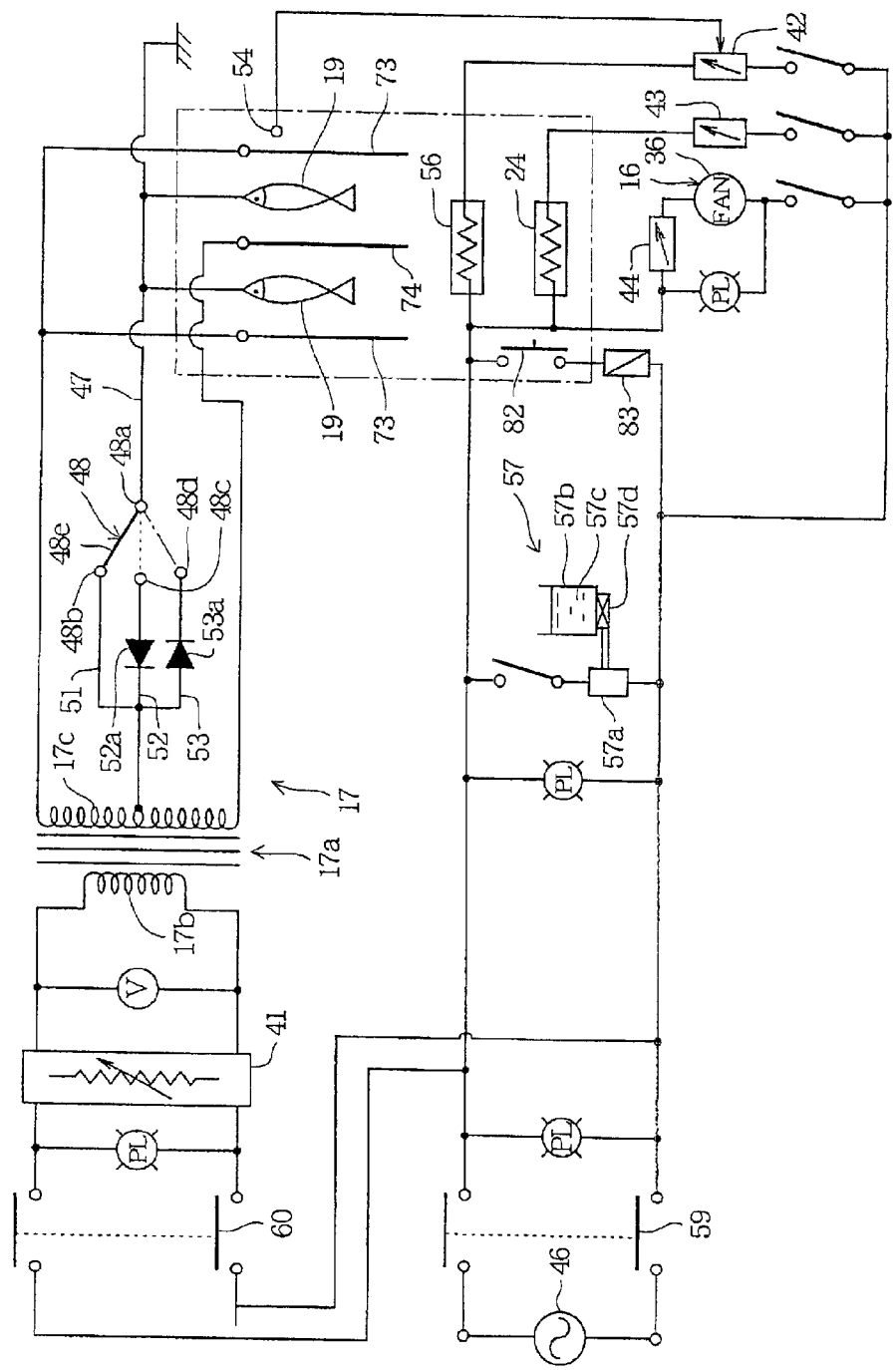
FIG. 10 is an electrical diagram of the apparatus of FIG. 9.

FIGS. 9 and 10 show a second embodiment of the present invention. Like reference numerals as used in FIGS. 1 and 3 are used to denote identical elements in FIGS. 9 and 10.

This embodiment includes a chamber 71 formed in a box shape having a door (not shown), and the chamber 71 is surrounded by a heat insulating material 72 (FIG. 9). Provided within the chamber 71 is a plurality of supporting tools 71a constituted to be capable of suspending (supporting) works 19 therefrom. Further, there is provided a plurality of electrode plates 73, 74 between the works 19 suspended from the supporting tools 71a, respectively, at predetermined distances from the works 19, respectively. In this embodiment, the interior of the chamber 71 is divided into a first sub-chamber 71c and a second sub-chamber 71d, by a partition 71b. The plurality of electrode plates 73, 74 comprises first electrode plates 73 and second electrode plates 74, which are alternately arranged so as to interpose works 19 between them. The first electrode plates 73 are connected to one end of the secondary coil 17c of the high voltage generating circuit 17, and the second electrode plates 74 are connected to the other end of the secondary coil 17c. The other end of the intermediate tapping electric wire 47 is electrically connected to works 19 via supporting tools 71a, and works 19 are grounded via supporting tools 71a (FIG. 10). Similarly to the first embodiment, the distances between the electrode plates 73, 74 and works 19 are preferably set at 20 mm to 100 mm, and more preferably 25 to 80 mm, respectively.

The smoke generating means 16 is constituted in the same manner as the first embodiment, and housed in the lower part of a controlling box 75. The smoke generated by the smoke generating means 16 is introduced into the first and second sub-chambers 71c, 71d, through an introducing duct 76a and a smoke inlet 76b. In FIG. 9, reference numerals 39 designate ionizing electrode wires. The smoke introduced into the chamber 71 is constitutionally circulated by smoke circulating means 77. This smoke circulating means 77 includes a circulation duct 78 having opposite ends communicated with an upper part and a lower part of the chamber 71, respectively; and a fan (not shown) provided within the circulation duct 78. The upper end of the circulation duct 78 is communicated with a merging portion of an exhaust duct 81 (FIG. 9). The constitution is such that operation of the fan causes the smoke at the upper level within the chamber 71 to flow into the upper end of the circulation duct 78 via exhaust duct 81, to flow down within the circulation duct 78, and then to be discharged into the chamber 71 from the lower end of the circulation duct 78.

In FIG. 10, reference numeral 82 designates a door sensor which is turned off when the door is closed and turned on when the door is opened, and reference numeral 83 designates an electro-magnet for passing an electric current so as to turn off the high-voltage-generating-circuit oriented switch 60 when the door is opened to thereby turn on the door sensor 82. The remaining constitution is identical with that of the first embodiment. In this second embodiment, works have been suspended from supporting tools. However, works may be pinched by the transporting means or disposed on the transporting means, insofar as works can be transported by the transporting means at predetermined intervals.

Redundant explanation shall be omitted concerning the thus constituted smoking apparatus, since its operation is substantially identical with that of the first embodiment, except that the smoking apparatus of the second embodiment is of a batch type in which: works 19 are suspended from supporting tools 71a after opening the door, the predetermined voltage is then applied between the electrode plates 73, 74, and works 19 are taken out from within the chamber 71 after a lapse of a predetermined period of time. In the smoking apparatus of this second embodiment, works 19 are grounded to thereby avoid the risk of an electrical shock upon erroneous touching at works 19 during operation of the smoking apparatus.

Figure 11:
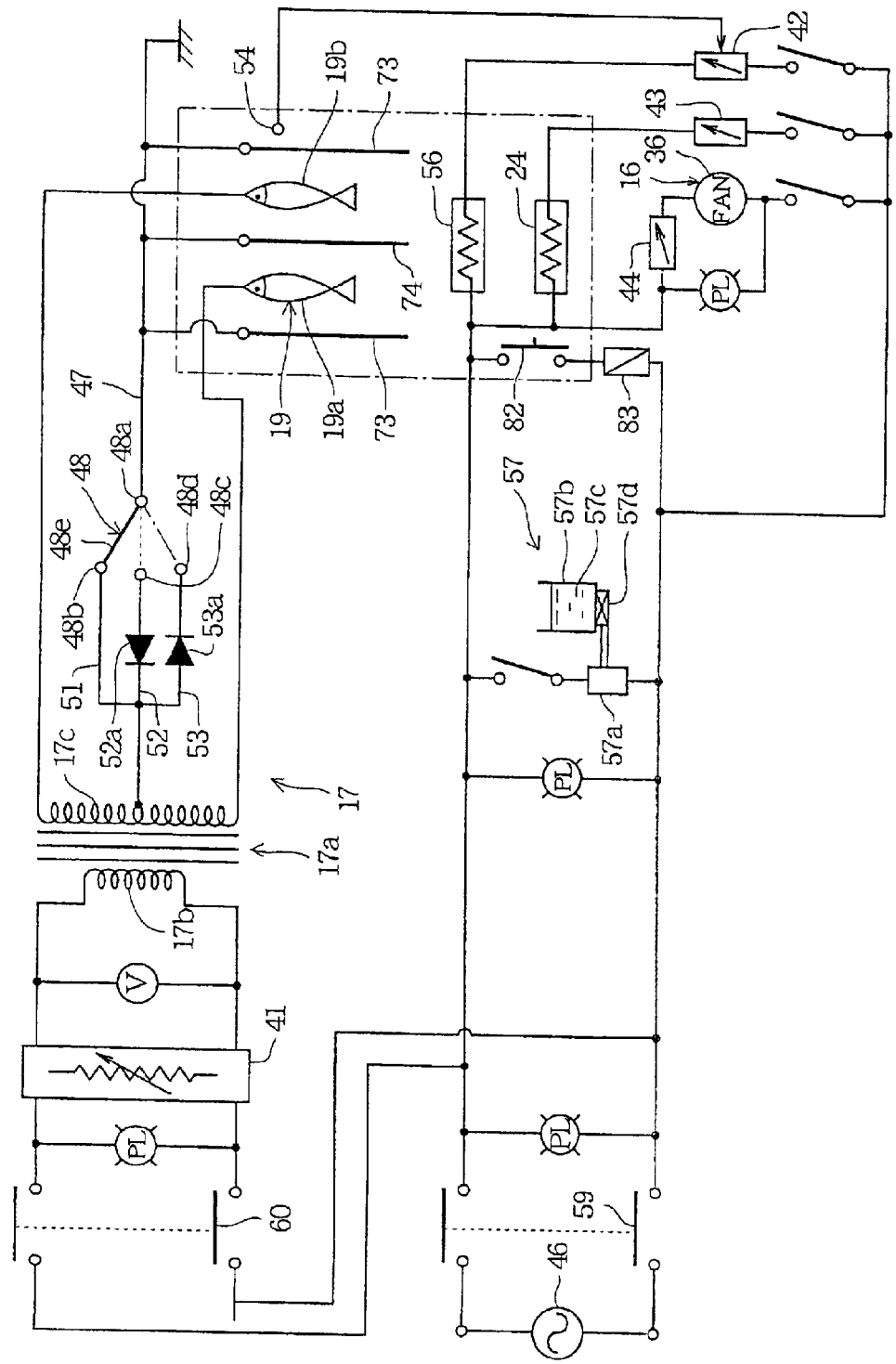
FIG. 11 is an electrical diagram showing a third embodiment of the present invention.

FIG. 11 shows a third embodiment of the present invention. Like reference numerals as used in FIG. 10 are used to denote identical elements in FIG. 11.

In this embodiment, one end of the secondary coil 17c of the high voltage generating circuit 17 is connected to first works 19a of the plurality of works 19, the other end is connected to second works 19b, and the other end of the intermediate tapping electric wire 47 is connected to the plurality of electrode plates 73, 74. The first works 19a and second works 19b are mutually juxtaposed between the electrode plates 73, 74, respectively, and these electrode plates 73, 74 are grounded. Similarly to the second embodiment, the distances between the adjacent electrode plates 73, 74 and works 19a, 19b are preferably set at 20 mm to 100 mm, and more preferably 25 to 80 mm, respectively. The remaining constitution is identical with that of the second embodiment.

Redundant explanation shall be omitted concerning the thus constituted smoking apparatus, since its operation is substantially identical with that of the second embodiment.

Figure 12:
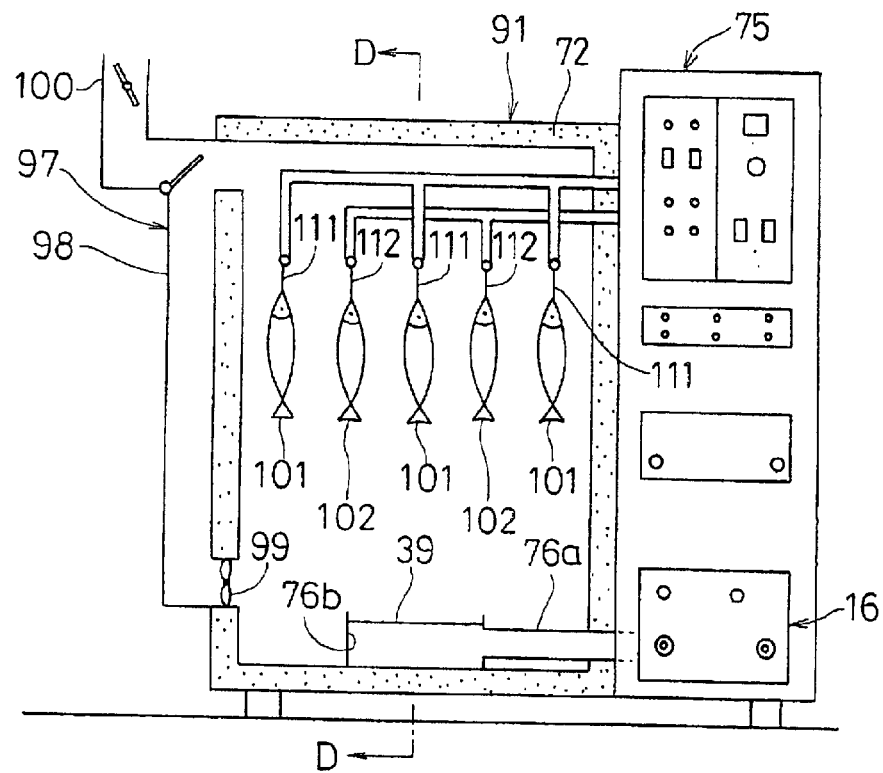
FIG. 12 is a cross-sectional view of a constitution showing a fourth embodiment of the present invention.
Figure 13:
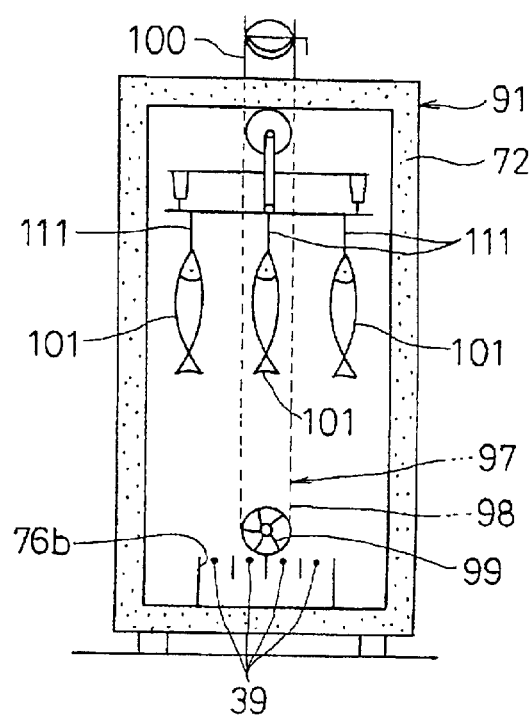
FIG. 13 is a cross-sectional view taken along a line D—D of FIG. 12.
Figure 14:
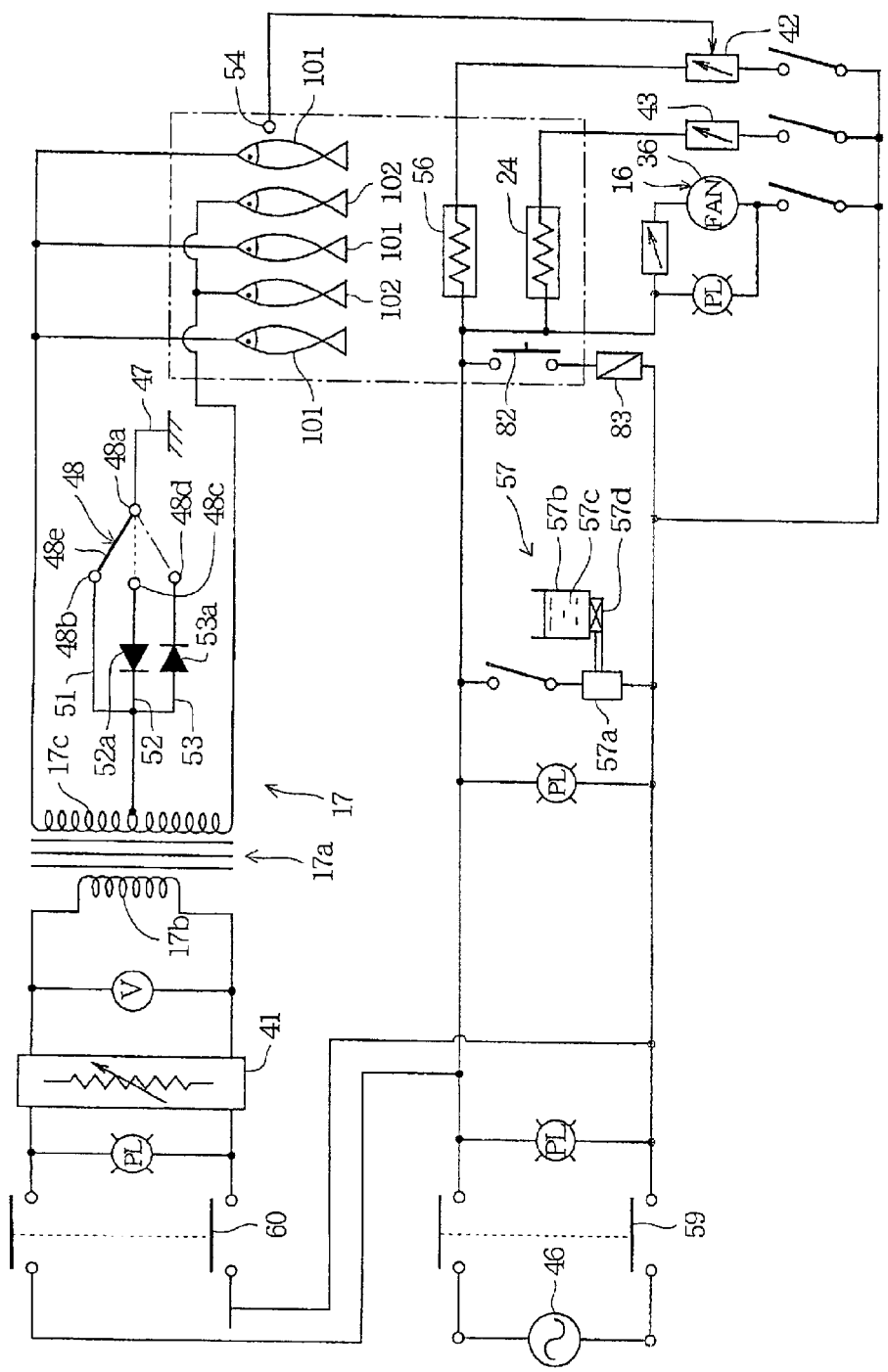
FIG. 14 is an electrical diagram of the apparatus of FIG. 12.

FIGS. 12 through 14 show a fourth embodiment of the present invention. Like reference numerals as used in FIGS. 9 and 10 are used to denote identical elements in FIGS. 12 through 14.

In this embodiment, provided within a chamber 91 are: a plurality of first electrodes 111 capable of suspending a plurality of first works 101, respectively, and being electrically connected to first works 101, respectively; and a plurality of second electrodes 112, each of which is disposed between the first electrodes 111 and separated therefrom by predetermined distances, in which the second electrodes 112 are capable of suspending a plurality of second works 102, respectively, and electrically connected to the plurality of second works 102, respectively (FIG. 12 and FIG. 13). One end of the secondary coil 17c of the high voltage generating circuit 17 is electrically connected to the first works 101 via first electrodes 111, respectively, and the other end of the secondary coil 17c is electrically connected to the second works 102 via second electrodes 112, respectively (FIG. 14). Further, the other end of the intermediate tapping electric wire 47 is grounded, and no electrode plates are used. The distances between adjacent first works 101 and second works 102 are preferably set at 20 mm to 100 mm, and more preferably 25 to 80 mm, respectively. In FIGS. 12 and 13, reference numeral 97 designates smoke circulating means which includes: a circulation duct 98 having opposite ends communicated with the upper and lower portions of the chamber 91; and a fan 99 for circulating the smoke within the chamber 91. Communicated with the upper part of the circulation duct 98 is an exhaust duct 100. The remaining constitution is identical with that of the second embodiment.

Redundant explanation shall be omitted concerning the thus constituted smoking apparatus, since its operation is substantially identical with that of the second embodiment.

Further, works have been suspended from the first and second electrodes, in the fourth embodiment. However, works may be constitutionally pinched by the first electrodes and second electrodes, respectively, or disposed on the first and second electrodes, respectively.

Figure 15:
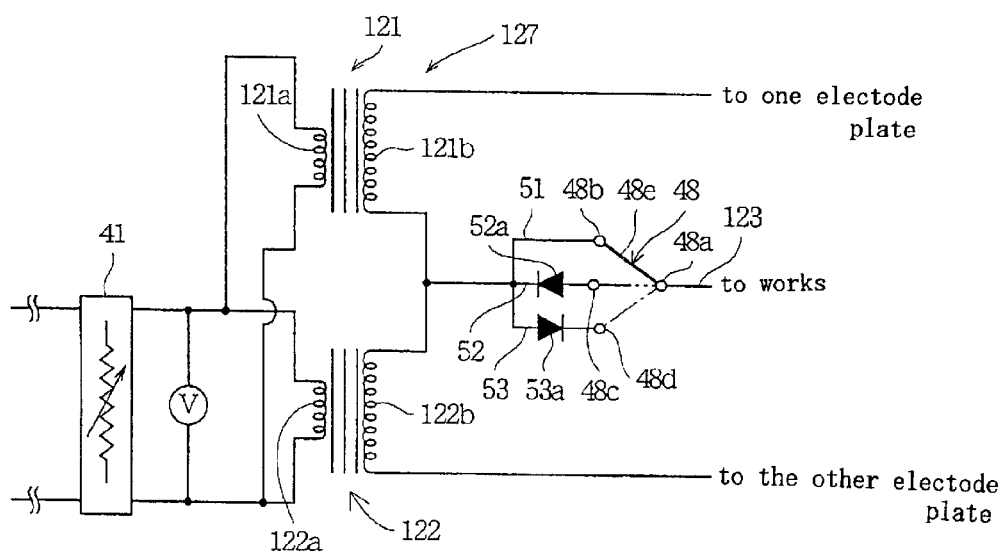
FIG. 15 is a view showing a high voltage generating circuit according to a fifth embodiment of the present invention.

FIG. 15 shows a fifth embodiment of the present invention. Like reference numerals as used in FIG. 3 are used to denote identical elements in FIG. 15.

In this embodiment, there is provided a high voltage generating circuit 127 including identical first and second transformers 121, 122 for boosting the commercial frequency voltage up to an AC voltage at 3.5 kV to 7.5 kV, and preferably 4 kV to 6 kV. One ends of the first and second secondary coils 121b, 122b of the first and second transformers 121, 122 are electrically connected to electrode plates (not shown), respectively, and the other ends of the first and second secondary coils 121b, 122b of the first and second transformers 121, 122 are electrically connected to works (not shown) via common electric wire 123. Similarly to the first embodiment, the first through third branching electric wires 51, 52, 53 are connected to the common electric wire 123, and the second and third branching electric wire 52, 53 are provided with first and second diodes 52a, 53a. In FIG. 15, reference numerals 121a, 122a designate primary coils of the first and second transformers 121, 122, respectively. The remaining constitution is identical with that of the first embodiment.

In the thus constituted smoking apparatus, the electric potential difference between one electrode plate and the other electrode plate becomes larger than that in the first embodiment, assuming that the voltage of the commercial frequency power source is kept constant. Thus, the electrified smoke rapidly adheres onto works. Redundant explanation shall be omitted concerning the thus constituted smoking apparatus, since its operation is substantially identical with that of the first embodiment.

Note, the high voltage generating circuit of this embodiment may be applied to the second through fourth embodiments.

Figure 16:
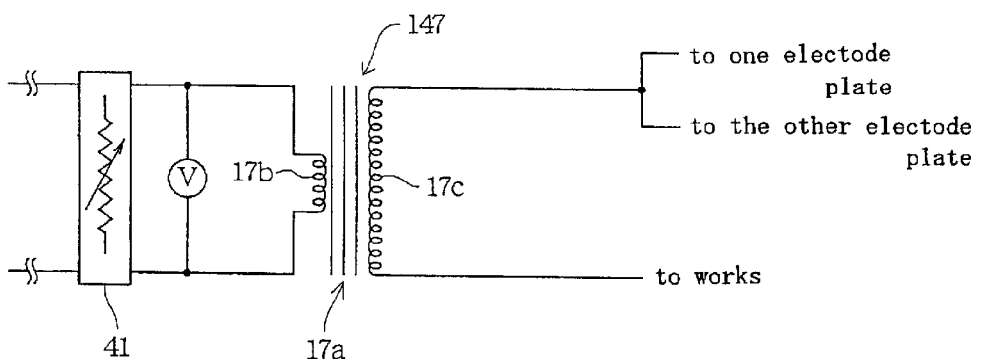
FIG. 16 is a view showing a high voltage generating circuit according to a sixth embodiment of the present invention.

FIG. 16 shows a sixth embodiment of the present invention. Like reference numerals as used in FIG. 10 are used to denote identical elements in FIG. 16.

In this embodiment, one end of the secondary coil 17c of a high voltage generating circuit 147 is connected to all of the electrode plates (not shown), the other end of the secondary coil 17c is connected to works (not shown), and no intermediate tapping electric wires are used. In FIG. 16, reference numeral 17a designates a transformer, and reference numeral 17b designates a primary coil. The remaining constitution is identical with that of the second embodiment.

In the thus constituted smoking apparatus, electrode plates have surface areas larger than those of works. Further, when one electrode plate is plus, the other electrode plate is also plus. When one electrode plate is minus, the other electrode plate is also minus. Thus, the efficiency of adherence and infiltration of electrified smoke is slightly deteriorated. Nonetheless, it is still possible to render the electrified smoke to adhere onto and infiltrate into works. Redundant explanation shall be omitted concerning the thus constituted smoking apparatus, since its operation is substantially identical with that of the first embodiment.

Figure 17:
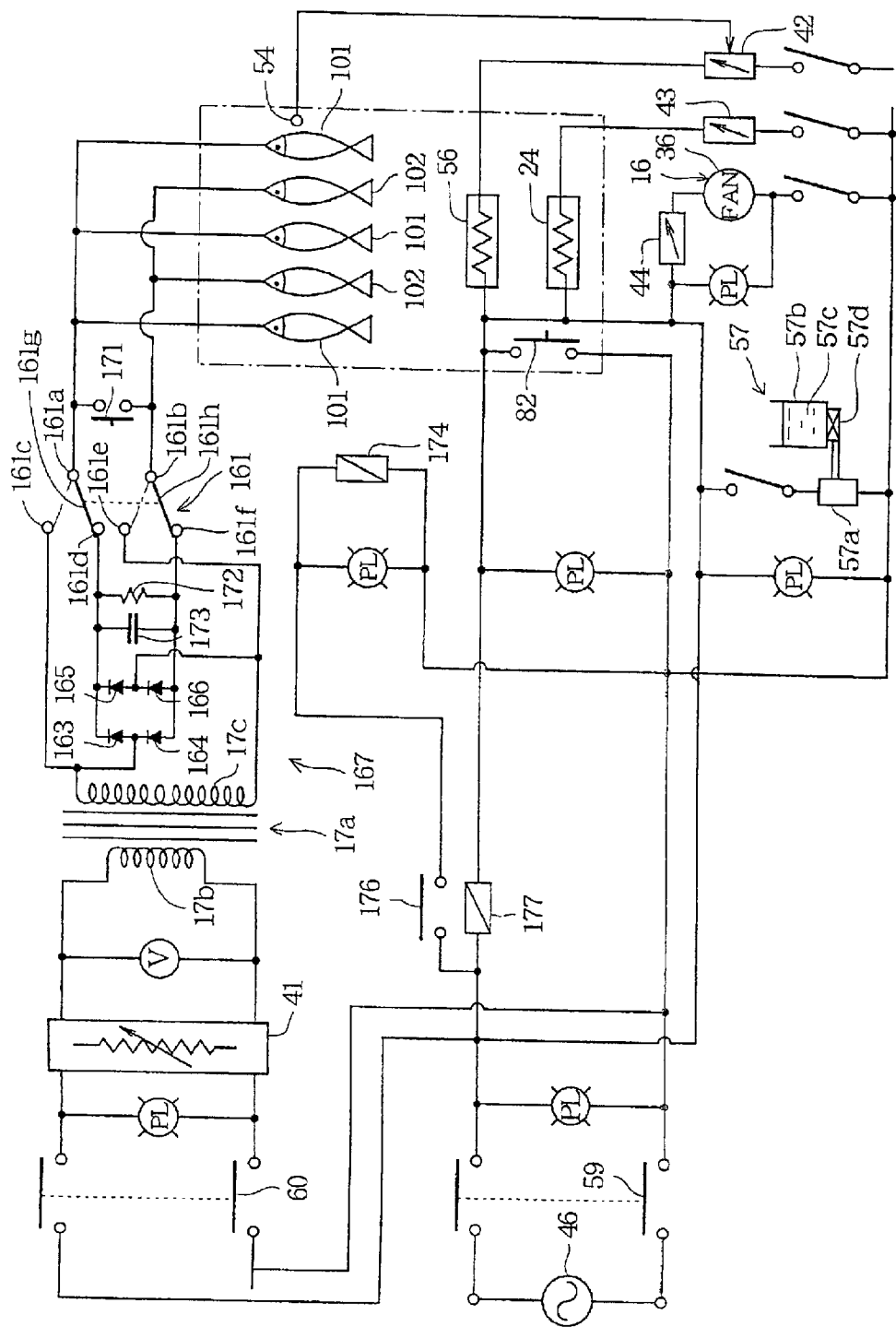
FIG. 17 is a view showing a high voltage generating circuit according to a seventh embodiment of the present invention.

FIG. 17 shows a seventh embodiment of the present invention. Like reference numerals as used in FIG. 14 are used to denote identical elements in FIG. 17.

In this embodiment, connected to the secondary coil 17c of a high voltage generating circuit 167 are third through sixth diodes 163 to 166, and a twin switch 161. Among the third through sixth diodes 163 to 166, the third and fourth diodes 163, 164 are serially connected to each other, fifth and sixth diodes 165, 166 are serially connected to each other, and the third and fourth diode 163, 164 and the fifth and sixth diodes 165, 166 are connected parallelly to each other. Further, the node between the third diode 163 and fourth diode 164 is connected to one end of the secondary coil 17c, and the node between the fifth diode 165 and sixth diode 166 is connected to the other end of the secondary coil 17c. The twin switch 161 includes: first and second common contacts 161a, 161b; first through fourth changeover contacts 161c through 161f; and first and second movable pieces 161g, 161h. The first changeover contact 161c is connected to one end of the secondary coil 17c, and the second changeover contact 161d is connected to the third and fifth diodes 163, 165. Further, the third changeover contact 161e is connected to the fourth and sixth diodes 164, 166, and the fourth changeover contact 161f is connected to the other end of the secondary coil 17c. The first common contact 161a is connected to first works 101, and the second common contact 161b is connected to second works 102.

The twin switch 161 is a manual changeover switch, and constituted to be switchable under an OFF state of the high-voltage-generating-circuit oriented switch 60. Reference numeral 171 designates a safety switch, reference numeral 172 designates a high resistance resistor, and reference numeral 173 designates a capacitor. Further, reference numeral 174 designates a safety electro-magnet for turning on the safety switch 171, and reference numeral 177 designates an operating-switch-oriented electro-magnet for turning on the magnetic operating switch 176. The remaining constitution is identical with that of the fourth embodiment.

In the thus constituted smoking apparatus, there is applied an AC voltage between first and second works 101, 102, by turning ON the high-voltage-generating-circuit oriented switch 60 after switching the movable pieces 161g, 161h of the twin switch 161 into the chain line positions in a state that the high-voltage-generating-circuit oriented switch 60 is kept off. Further, there is applied a DC voltage between first and second works 101, 102, by turning ON the high-voltage-generating-circuit oriented switch 60 after switching the movable pieces 161g, 161h of the twin switch 161 into the solid line positions in a state that the high-voltage-generating-circuit oriented switch 60 is kept off. Application of a DC voltage between first and second works 101, 102 turns first works 101 into positive electrodes and second works 102 into negative electrodes, in this embodiment. As a result, the negatively electrified smoke adheres to and infiltrates into first works 101 and the positively electrified smoke adheres to and infiltrates into to second works 102, so that first and second works 101, 102 are finished into smoked foods having tastes different from each other.

Further, when the door is opened after a DC voltage is applied between the first and second works 101, 102, the door sensor 82 is turned on so as to flow an electric current through the operating-switch-oriented electro-magnet 177 to thereby turn on the magnetic operating switch 176. Turning on the magnetic operating switch 176 leads to a flow of an electric current through the safety electro-magnet 174 to thereby turn on the safety switch 171. As a result, the electric charge accumulated in the first and second works 101, 102 are immediately discharged at the safety switch 171 and resistor 172, thereby avoiding an electrical shock of a worker even upon contacting with the first and second works 101, 102. Redundant explanation shall be omitted concerning the thus constituted smoking apparatus, since its operation is substantially identical with that of the fourth embodiment.

Figure 18:
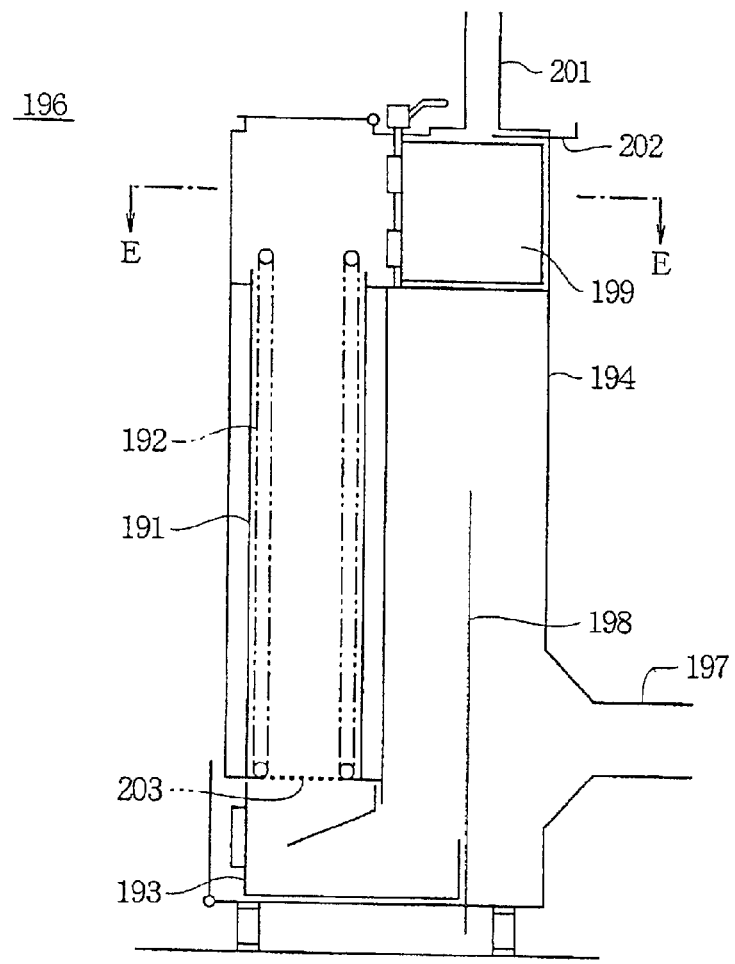
FIG. 18 is a cross-sectional view of a constitution showing smoke generating means according to an eighth embodiment of the present invention.
Figure 19:
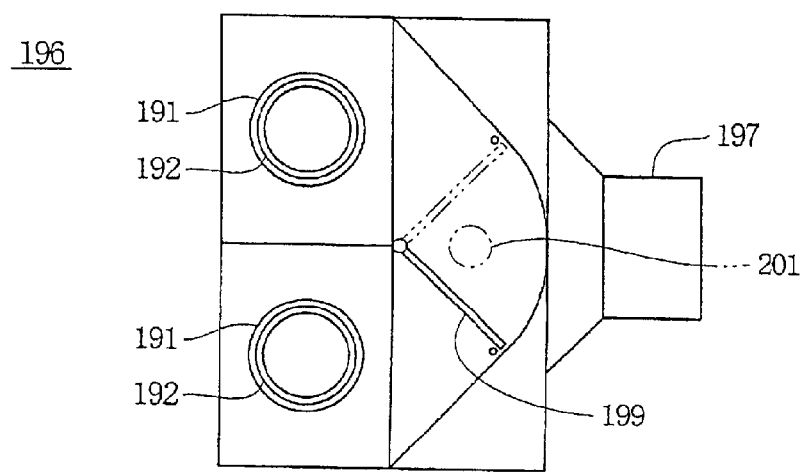
FIG. 19 is a cross-sectional view taken along a line E—E of FIG. 18.

FIGS. 18 and 19 show an eighth embodiment of the present invention.

In this embodiment, smoke generating means 196 includes: vertically extending two cylindrical bodies 191, 191; smoke generating cylinders 192, 192 which are formed by spirally winding rods at a predetermined spacing therebetween and housed within the cylindrical bodies 191, 191, respectively; ash trays 193 provided below the cylindrical bodies 191, 191, respectively; a guiding cylinder 194 disposed adjacent to the cylindrical body 191 and communicated with the lower end of the cylindrical bodies 191, 191 to thereby guide the smoke therefrom; a smoke outflow pipe 197 communicated to the side surface of the guiding cylinder 194; and a blower (not shown) provided in the smoke outflow pipe 197. The two cylindrical bodies 191, 191 are formed integrally with the guiding cylinder 194. The guiding cylinder 194 is constituted such that the smoke is guided through a path in an inverted "U" shape provided by an upstanding partition plate 198 within the guiding cylinder 194. Communicated to the upper surface of the guiding cylinder 194 is an air introducing pipe 201, via switching damper 199. The switching damper 199 is switched to communicate the air introducing pipe 201 to one of the cylindrical bodies 191, 191. In FIG. 18, reference numeral 202 designates a flow rate adjusting damper for adjusting the air amount to be introduced, and reference numeral 203 designates a wire mesh for preventing passage of an unburnt smoking material and for allowing passage of the ash of the burnt smoking material.

In the thus constituted smoking apparatus, when the blower is operated in a state where the smoking material is stored within the cylindrical body 191 inserted with the smoke generating cylinder 192, air is introduced through the air introducing pipe 201 into the cylindrical body 191, flowed down in the cylindrical body 191 and then through the guiding cylinder 194, and thereafter blown out of the smoke outflow pipe 197. Firing the upper end of the smoking material in this state leads to incomplete combustion of the smoking material to cause la smoke, and this smoke is carried by the air stream and blown out of the smoke outflow pipe 197 into the chamber (not shown).

Figure 20:
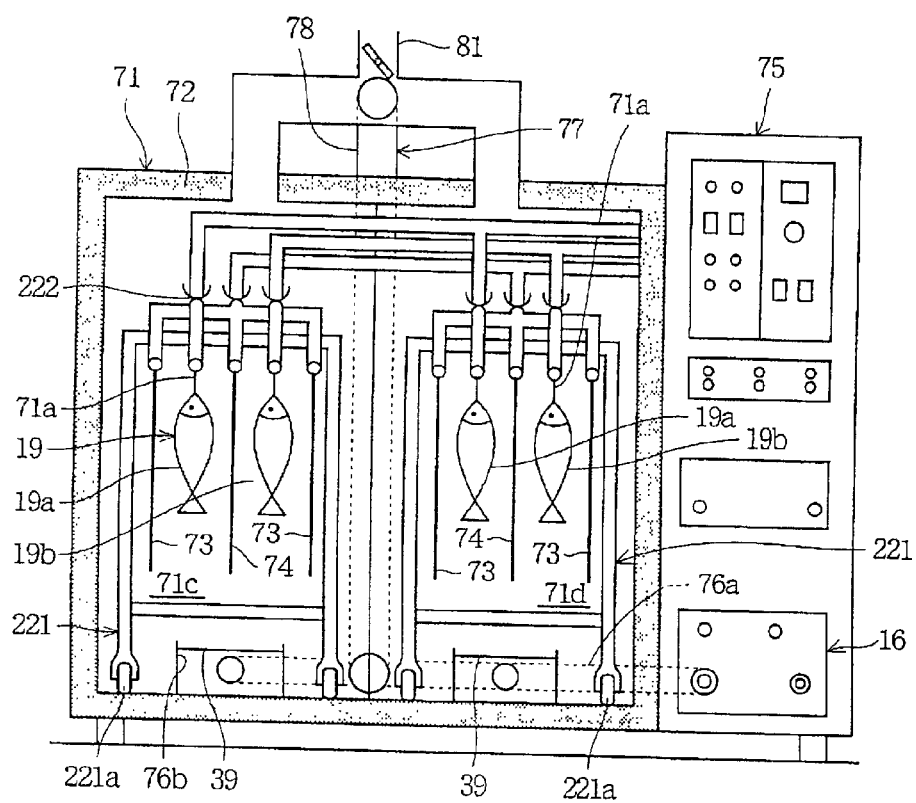
FIG. 20 is a cross-sectional view of a constitution showing a ninth embodiment of the present invention, correspondingly to FIG. 9.
Figure 21:
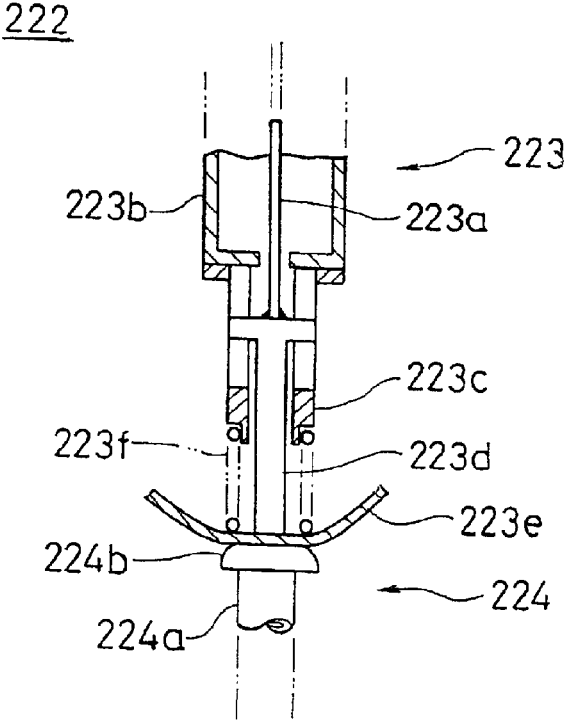
FIG. 21 is a cross-sectional view of a constitution including a contacting-type collector of the ninth embodiment.

FIGS. 20 and 21 show a ninth embodiment of the present invention. Like reference numerals as used in FIG. 9 are used to denote identical elements in FIG. 20.

In this embodiment, supporting tools 71a and electrode plates 73, 74 are provided in racks 221 to be removably moved into the chamber 71, and the supporting tools 71a and electrode plates 73, 74 are electrically connected to the high voltage generating circuit via contact type electric collectors 222, respectively. Racks 221 are formed into rectangular parallelepipeds, respectively, and are attached with wheels 221a. Each contact type electric collector 222 includes a feeding portion 223 fixed at the upper part within the chamber 71, and a receiving portion 224 fixed at the upper end of the rack 221. The feeding portion 223 comprises: a cylindrical body 223b having a lead 223a inserted therein; a slider holder 223c attached to the lower end of the cylindrical body 223b; a slider 223d vertically slidably inserted in the slider holder 223c; and an upper contact shoe 223e attached to the lower end of the slider 223d. The cylindrical body 223b and slider holder 223c are formed of an electrical insulating material, and the slider 223d and upper contact shoe 223e are formed of an electrical conductive material. The lower end of the lead 223a is connected to the upper end of the slider 223d, and the upper end of the lead 223a is connected to the high voltage generating circuit or is grounded. In FIG. 21, reference numeral 223f designates a compressed coil spring for urging the upper contact shoe 223e in a pushing down direction.

The receiving portion 224 comprises: a receiving body 224a attached with the supporting tool 71a or electrode plate 73 or 74 at the lower end of the body 224a; and a lower contact shoe 224b attached to the upper end of the receiving body 224a and adapted to contact with the upper contact shoe 223e. The receiving body 224a and lower contact shoe 224b are formed of an electrical conductive material. The upper contact shoe 223e is curvedly formed in a substantially "U" shape, and the upper surface of the lower contact shoe 224b is curvedly formed in a substantially inverted "U" shape.

In this embodiment, first works 19a are connected to one end of the secondary coil of the high voltage generating circuit, second works 19b are connected to the other end of the secondary coil, and the electrode plates 73, 74 are grounded. Namely, the connecting manner to the high voltage generating circuit and the grounding manner of the works 19a, 19b and electrode plates 73, 74 are the same as the third embodiment. The remaining constitution is identical with that of the second embodiment.

In the thus constituted smoking apparatus, works 19a, 19b are suspended from the supporting tools 71a of the racks 221 outside the chamber 71, respectively, and then the racks 221 are traveled on a slope plate (not shown) bridged between the floor and the chamber 71. As the racks 221 are housed in the chamber 71, the lower contact shoes 224b of the receiving portions 224 are contacted with the upper contact shoes 223e of the feeding portions 223, respectively. When the door is closed to thereby turn on the high-voltage-generating-circuit oriented switch (not shown), there is applied a predetermined voltage between works 19a, 19b similarly to the third embodiment. After completion of a smoking process, the high-voltage-generating-circuit oriented switch is turned off and the door is opened, the racks 221 are drawn out of the chamber 71, and then works 19a, 19b are removed from the supporting tools 71a of the racks 221. In this way, attaching and removing works 19a, 19b to and from supporting tools 71a can be conducted outside the chamber 71, thereby improving workability.

In this embodiment, first works are connected to the one end of the secondary coil of the high voltage generating circuit, second works are connected to the other end of the secondary coil, and the electrode plates are grounded. However, similarly to the second embodiment, one of the electrode plates may be connected to the one end of the secondary coil, the other of the electrode plates may be connected to the other end of the secondary coil, and works may be grounded.

Further, the smoking apparatus of this embodiment may be applied to that of the fourth embodiment. Namely, it is possible to provide first and second electrodes on a rack adapted to be removably moved into the chamber, and to electrically connect the first and second electrodes to the high voltage generating circuit via contact type collectors.

Figure 22:
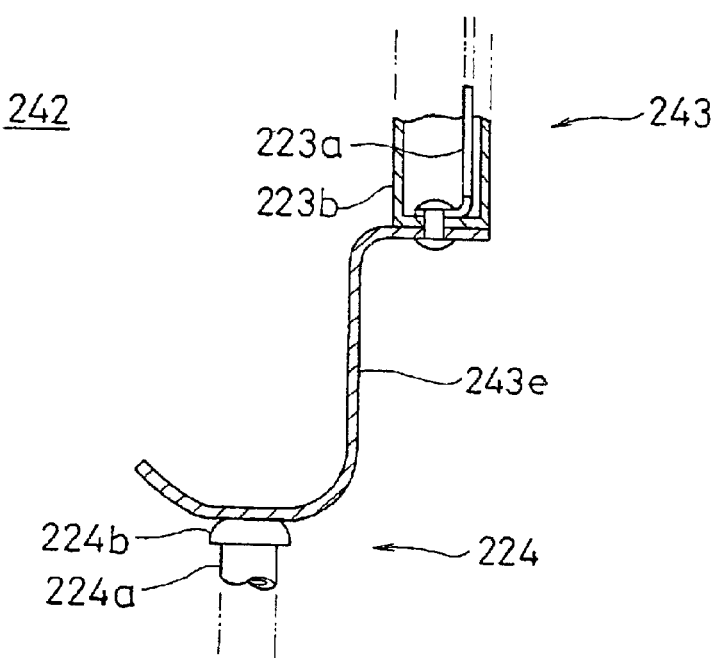
FIG. 22 is a cross-sectional view of a constitution showing a tenth embodiment of the present invention, correspondingly to FIG. 21.

FIG. 22 shows a tenth embodiment of the present invention. Like reference numerals as used in FIG. 21 are used to denote identical elements in FIG. 22.

This embodiment is constituted identically with the ninth embodiment, except that: the tenth embodiment uses a leaf spring as an upper contact shoe 243e of a feeding portion 243 of a contact type collector 242, to thereby omit the slider, slider holder and compressed coil spring in the ninth embodiment.

In the operation of the thus constituted smoking apparatus, the number of parts of the feeding portion 243 of the contact type collector 242 is less than that of the ninth embodiment, to thereby enabling reduction of the number of assembling processes of the feeding portion 243. Redundant explanation shall be omitted concerning the thus constituted smoking apparatus, since its operation is substantially identical with that of the ninth embodiment.

According to the present invention as described above, grounded works are transported by the transporting means at a predetermined speed into the;chamber into which the smoke is introduced, and the voltage of 7 kV to 15 kV is applied between the pair of electrode plates arranged to interpose therebetween works along the transporting means within the chamber so as not to start discharge. Thus, there is generated a predetermined electric field incapable of initiating discharge between the pair of electrode plates to thereby electrify the smoke, and the thus electrified smoke adheres to and infiltrates into works by a Coulomb force based on the electric potential difference between the pair of electrode plates. This results in a lower voltage to be applied between the pair of electrode plates and in a smaller amount of an electric current, to thereby reduce the electric power consumption. Further, because discharge such as corona discharge is not initiated between the electrode plates and works, the electrified smoke uniformly adheres to and infiltrates into works.

Further, by introducing the smoke into the chamber containing therein works and electrode plates alternately arranged with each other at predetermined intervals, and by applying a DC voltage or AC voltage of 7 kV to 15 kV between the electrode plates or between works so as not to initiate discharge, there is generated an electric field incapable of initiating discharge between the electrode plates or between works to thereby electrify the smoke, and the thus electrified smoke adheres to and infiltrates into works by a Coulomb force based on the electric potential difference between the electrode plates or between works. This results in the same effect as the above.

Moreover, by arranging first and second electrodes at a predetermined interval within the chamber, by introducing the smoke into the chamber, by electrically connecting first and second works to the first and second electrodes, respectively, and by applying a DC voltage or AC voltage of 7 kV to 15 kV between the first and second electrodes so as not to initiate discharge, there is generated an electric field incapable of initiating discharge between the first and second works to thereby electrify the smoke, and the thus electrified smoke adheres to and infiltrates into the first and second works by a Coulomb force based on the electric potential difference between the first and second works. This results in the same effect as the above.

By setting the distance between the adjacent electrode plate and work or between adjacent works at 20 mm to 100 mm, there can be more assuredly prevented initiation of discharge such as corona discharge or streamer discharge between the adjacent electrode plate and work or between the adjacent works.

Further, by inserting the transporting means into the chamber formed with the inlet and outlet at opposite ends of the chamber, by transporting the works spaced at predetermined intervals by the transporting means, by providing the pair of electrode plates along the longitudinal direction of the transporting means so as to interpose works between the electrode plates, by generating the smoke and introducing it into the chamber by the smoke generating means, and by grounding works and applying a voltage of 7 kV to 15 kV between the pair of electrode plates by the high voltage generating circuit so as not to start discharge, there is generated an electric field incapable of initiating discharge between the pair of electrode plates to thereby electrify the smoke, and the thus electrified smoke adheres to and infiltrates into the works by a Coulomb force based on the electric potential difference between the pair of electrode plates, similarly to the above. This results in a lower voltage to be applied between the pair of electrode plates and in a smaller amount of an electric current, to thereby reduce the electric power consumption and, to thereby downsize the whole apparatus. Further, because discharge such as corona discharge is not initiated between the electrode plates and works, the electrified smoke uniformly adheres to and infiltrates into works.

By supporting works by the supporting tools disposed within the chamber, by providing electrode plates between these works, by generating the smoke and introducing it into the chamber by the smoke generating means, and by applying a DC voltage or AC voltage of 7 kV to 15 kV between works or the electrode plates so as not to initiate discharge, there is generated an electric field incapable of initiating discharge between the electrode plates or between works to thereby electrify the smoke, and the thus electrified smoke adheres to and infiltrates into works by a Coulomb force based on the electric potential difference between the electrode plates or between works. This results in the same effect as the above.

Moreover, by electrically connecting first and second works to first and second electrodes alternately disposed within the chamber, respectively, by generating the smoke and introducing it into the chamber by the smoke generating means, and by applying a DC voltage or AC voltage of 7 kV to 15 kV between the first and second electrodes so as not to initiate discharge, there is generated an electric field incapable of initiating discharge between the first and second works to thereby electrify the smoke, and the thus electrified smoke adheres to and infiltrates into the first and second works by a Coulomb force based on the electric potential difference between the first and second works. This results in the same effect as the above.

When the high voltage generating circuit has a single transformer for boosting the commercial frequency voltage up to an AC voltage of 7 kV to 15 kV, when both ends of this transformer are electrically connected to electrode plates or to works, and when the other end of the intermediate tapping electric wire having its one end electrically connected to works or electrode plates is electrically connected to an intermediate portion of the secondary coil, one of the pair of electrode plates or of the works becomes plus when the other becomes minus so that the electrified smoke between the electrode plates or between works is immediately forced along the electric field generated between the electrode plates or between the works to thereby adhere onto and infiltrate into the works. This allows efficient adherence and infiltration of the electrified smoke onto and into works.

When the high voltage generating circuit has identical first and second transformers for boosting the commercial frequency voltage up to an AC voltage of 7 kV to 15 kV, when one ends of the transformers are electrically connected to electrode plates or to works, respectively, and when the other ends of the secondary coils of the first and second transformers are electrically connected to the works or electrode plates via common electric wire, the electrified smoke immediately adheres to and infiltrates into works. This allows efficient adherence and infiltration of the electrified smoke onto and into works.

Further, by providing the intermediate tapping electric wire or the common electric wire with diodes for rectifying the electric current flowing through the pertinent electric wire, it becomes possible to give a desired plus or minus electric charge to the smoke. This ensures adherence and infiltration of the desired smoke onto and into works, to thereby enable manufacture of a smoked food having a desired taste.

By storing the smoking material in the hopper of the smoke generating means, by transporting this smoking material by a screw conveyor, and by incompletely burning the thus transported smoking material by the burn heater to thereby generate the smoke and introduce it into the chamber, simple supply of the smoking material into the hopper enables automatic generation of the smoke and automatic introduction of the smoke into the chamber. Further, since the flow rate of the smoke can be extremely reduced, the efficiency of adherence and infiltration of the smoke onto and into works can be improved.

By providing the ionizing electrode wire across the smoke inlet, and by applying a voltage of 6 kV to 10 kV to the ionizing electrode wire, there is initiated streamer discharge between the ionizing electrode wire and the smoke to thereby previously electrify the smoke. As a result, it becomes possible to adhere and infiltrate the smoke onto and into the work more rapidly. Further, the streamer discharge requires an electric current less than that for corona discharge, so that the increase in the electric power consumption is only a little.

Further, by communicating opposite ends of the circulation duct of the smoke circulating means to the upper part and lower part of the chamber, respectively, and by providing the fan within the circulation duct, operation of the fan causes the smoke at the upper level within the chamber to be drawn into the upper end of the circulation duct and then to be discharged into the chamber from the lower end of the circulation duct. This enables circulation of the smoke introduced into the chamber, to thereby allow utilization of the smoke without wastefulness.

By adding condiments into the liquid within the tank of the humidifier for keeping the humidity within the chamber constant, operation of the humidifier causes the condiments to be introduced into the chamber together with the liquid atomized by the humidifier, to thereby adhere onto and infiltrate into works. As a result, works are finished into smoked foods having deepened tastes.

Further, by providing supporting tools and electrode plates or first and second electrodes on the rack to be removably moved into the chamber, and by electrically connecting the supporting tools and electrode plates or first and second electrodes to the high voltage generating circuit via contact type collectors, attaching and removing works to and from supporting tools or first and second electrodes can be conducted outside the chamber, thereby improving workability.

INDUSTRIAL APPLICABILITY

The smoking method and apparatus of the present invention renders the smoke to adhere onto and infiltrate into farm products, marine products and livestock products or processed foods thereof, making use of a Coulomb force of the aforementioned farm products and the like and the smoke electrified in the electric field when the smoke is to be adhered to and infiltrated into the aforementioned farm products and the like. This enables: uniform adherence and infiltration of the smoke onto and into works such as the aforementioned farm products and the like; an improved quality of smoked foods; and utilization of the smoke without wastefulness.

What is claimed is:

1. A smoking method comprising the steps of:
   introducing smoke into a chamber having opposite ends thereof formed with an inlet and an exit, an electrically insulative curtain being attached thereto, respectively,
   transporting grounded foods at a predetermined speed into said chamber by transporting means, said foods comprising farm products, marine products and livestock products or processed foods thereof, and
   applying a DC voltage or AC voltage of 7 kV to 15 kV between a pair of electrode plates disposed along said transporting means within said chamber so as to interpose the foods between said pair of electrode plates under the starting voltage.

2. A smoking method comprising the steps of:
   introducing smoke into a chamber having an electrically insulative curtain, wherein the chamber contains foods and electrode plates alternately arranged with each other at predetermined intervals, and
   applying a DC voltage or AC voltage of 7 kV to 15 kV between said electrode plates or between the foods, under the starting voltage.

3. A smoking method comprising the steps of:
   introducing smoke into a chamber having an electrically insulative curtain, wherein the chamber contains first and second electrode arranged at predetermined intervals, and electrically connecting first and second foods to said first and second electrodes, respectively, and applying a DC voltage or AC voltage of 7 kV to 15 kV between said first and second electrodes under the starting voltage.

4. A smoking method of any one of claims 1 through 3, wherein the distance between the electrode plate and foods being adjacent to the electrode plate or between adjacent foods is 20 mm to 100 mm.

5. A smoking apparatus comprising:
   a chamber having opposite ends thereof formed with an inlet and an exit an electrically insulative curtain being attached thereto, respectively,
   transporting means moved into said chamber from said inlet toward said exit, and for transporting a plurality of foods spaced at predetermined intervals, the foods comprising farm products, marine products and livestock products or processed foods thereof, a pair of electrode plates disposed within said chamber at predetermined distances from the foods, respectively, along the longitudinal direction of said transporting means so as to interpose the foods between said pair of electrode plates,
   smoke generating means for generating smoke to be adhered to and infiltrated into the foods, and for introducing the smoke into said chamber, and
   a high voltage generating circuit adapted to apply a DC voltage or AC voltage of 7 kV to 15 kV between said pair of electrode plates under the starting voltage, and to ground the foods.

6. A smoking apparatus comprising:
   supporting tools disposed within a chamber having an electrically insulative curtain, wherein the supporting tools support a plurality of foods at predetermined intervals, respectively,
   a plurality of electrode plates disposed between said foods supported by said supporting tools (71a), at predetermined distances from the foods, respectively
   smoke generating means for generating smoke to be adhered to and infiltrated into the foods, and for introducing the smoke into said chamber, and
   a high voltage generating circuit for applying a DC voltage or AC voltage of 7 kV to 15 kV between said plurality of electrode plates or between the plurality of foods under the starting voltage.

7. A smoking apparatus comprising:
   first electrodes disposed within a chamber having an electrically insulative curtain, and electrically connected to a plurality of first foods, respectively,
   second electrodes disposed within said chamber, each of second electrodes disposed between said first electrodes at predetermined distances from said first electrodes and electrically connected to a plurality of second foods,
   smoke generating means for generating smoke to be adhered to and infiltrated into the first and second foods, and for introducing the smoke into said chamber, and
   a high voltage generating circuit adapted to apply a DC voltage or AC voltage of 7 kV to 15 kV between said first and second electrodes under the starting voltage.

8. A smoking apparatus of any one of claims 5 through 7, wherein the distance between the electrode plate and foods being adjacent to the electrode plate or between adjacent foods is 20 mm to 100 mm.

9. A smoking apparatus of any one of claims 5 through 7, wherein said high voltage generating circuit includes a single transformer for boosting the commercial frequency voltage up to an AC voltage of 7 kV to 15 kV,
   wherein opposite ends of a secondary coil of said transformer are electrically connected to electrode plates or to foods, respectively, and
   wherein one end of an intermediate tapping electric wire having the other end electrically connected to the foods or to said electrode plates is electrically connected to an intermediate portion of said secondary coil.

10. A smoking apparatus of any one of claims 5 through 7, wherein said high voltage generating circuit includes identical first and second transformers for boosting the commercial frequency voltage up to an AC voltage of 7 kV to 15 kV,
   wherein one ends of secondary coils of said first and second transformers are electrically connected to electrode plates or to foods, respectively, and
   wherein the other ends of said secondary coils of said first and second transformers are electrically connected to foods or to electrode plates, respectively, via common electric wire.

11. A smoking apparatus of claim 9, wherein said intermediate tapping electric wire or said common electric wire is provided with a diode for rectifying the electric current flowing through said intermediate tapping electric wire or said common electric wire.

12. A smoking apparatus of any one of claims 5 through 7,
   wherein said smoke generating means includes a hopper for storing a smoking material,
   a screw conveyor for transporting the smoking material,
   a burn heater for incompletely burning the smoking material transported by said screw conveyor, to thereby generate smoke, and a smoke inlet for introducing the smoke into said chamber.

13. A smoking apparatus of claim 12, further comprising:
   an ionizing electrode wire provided across a smoke inlet for passing the smoke therethrough, said ionizing electrode wire being applied with a DC voltage or AC voltage of 6 kV to 10 kV.

14. A smoking apparatus of any one of claims 5 through 7, further comprising
   smoke circulating means for circulating the smoke introduced into said chamber,
   wherein said smoke circulating means comprises:
   a circulation duct having opposite ends communicated to an upper part and a lower part of said chamber, respectively, and
   a fan disposed within said circulation duct for drawing the smoke at the upper level within said chamber into the upper end of said circulation duct and for discharging the smoke from the,lower end of said circulation duct into said chamber.

15. A smoking apparatus of any one of claims 5 through 7, wherein condiments are added into a liquid within a tank of a humidifier for keeping the humidity within said chamber constant.

16. A smoking apparatus of claim 6 or 7, wherein said supporting tools and plurality of electrode plates, or said first and second electrodes, are provided on a rack to be removably moved into said chamber, and
   wherein said supporting tools and plurality of electrode plates, or said first and second electrodes, are electrically connected to said high voltage generating circuit via contact type electric collector.

17. A smoking apparatus of claim 10, wherein said intermediate tapping electric wire or said common electric wire is provided with a diode for rectifying the electric current flowing through said intermediate tapping electric wire or said common electric wire.

* * * * *